United States Patent
Hao et al.

(10) Patent No.: US 11,588,596 B2
(45) Date of Patent: Feb. 21, 2023

(54) SIGNALING DESIGN FOR NON-LINEAR PRECODING SCHEMES

(71) Applicant: Qualcomm Incorporated, San Diego, CA (US)

(72) Inventors: Chenxi Hao, Beijing (CN); Yu Zhang, Beijing (CN); Liangming Wu, Beijing (CN); Hao Xu, Beijing (CN); Wanshi Chen, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/056,209

(22) PCT Filed: Jun. 20, 2019

(86) PCT No.: PCT/CN2019/092033
§ 371 (c)(1),
(2) Date: Nov. 17, 2020

(87) PCT Pub. No.: WO2019/242677
PCT Pub. Date: Dec. 26, 2019

(65) Prior Publication Data
US 2021/0218523 A1    Jul. 15, 2021

(30) Foreign Application Priority Data
Jun. 21, 2018  (WO) ............... PCT/CN2018/092216

(51) Int. Cl.
*H04L 5/00* (2006.01)
*H04B 7/0452* (2017.01)
(52) U.S. Cl.
CPC .......... *H04L 5/0048* (2013.01); *H04B 7/0452* (2013.01)

(58) Field of Classification Search
CPC ..................... H04L 5/0048; H04B 7/0452
See application file for complete search history.

(56) References Cited

U.S. PATENT DOCUMENTS

| | | | |
|---|---|---|---|
| 5,491,802 A | 2/1996 | Thompson et al. | |
| 6,172,990 B1 | 1/2001 | Deb et al. | |

(Continued)

FOREIGN PATENT DOCUMENTS

| | | | |
|---|---|---|---|
| CN | 101594217 A | 12/2009 | |
| CN | 103430501 A | 12/2013 | |

(Continued)

OTHER PUBLICATIONS

Hochwald B. M., et al., A Vector-Perturbation Technique for Near-Capacity Multiantenna Multiuser Communication—Part II: Perturbation, IEEE Transactions on Communications, Mar. 31, 2005(Mar. 31, 2005) vol. 53, No. 3, pp. 537-544.

(Continued)

*Primary Examiner* — Duc C Ho
(74) *Attorney, Agent, or Firm* — Holland & Hart LLP

(57) ABSTRACT

Methods, systems, and devices for wireless communications are described. In some examples, a user equipment (UE) may receive, from a base station, a configuration associated with a layer to reference signal port mapping. In some cases, the UE may identify, based at least in part on the configuration, that at least one layer of a set of layers for receiving a downlink transmission from the base station is adapted based on at least one interference layer. In some cases, the adapted layer may be mapped to one or more reference signal ports. The UE may receive the downlink transmission and may decode the downlink transmission based on identifying that the at least one layer is adapted and the layer to reference signal port mapping.

30 Claims, 16 Drawing Sheets

(56) References Cited

U.S. PATENT DOCUMENTS

| | | | |
|---|---|---|---|
| 6,996,105 B1 | 2/2006 | Wilson | |
| 2010/0208837 A1 | 8/2010 | Vetter et al. | |
| 2012/0026964 A1 | 2/2012 | Koivisto et al. | |
| 2014/0233407 A1 | 8/2014 | Pourahmadi et al. | |
| 2016/0128025 A1* | 5/2016 | Zhang .................. | H04W 76/27 370/329 |
| 2016/0173262 A1 | 6/2016 | Davydov et al. | |
| 2017/0290046 A1 | 10/2017 | Sun et al. | |
| 2018/0102819 A1 | 4/2018 | Nishimoto et al. | |

FOREIGN PATENT DOCUMENTS

| | | |
|---|---|---|
| CN | 105324952 A | 2/2016 |
| CN | 105359440 A | 2/2016 |
| CN | 105531949 A | 4/2016 |
| CN | 105580433 A | 5/2016 |
| CN | 107370563 A | 11/2017 |
| WO | WO-2013163255 A1 | 10/2013 |

OTHER PUBLICATIONS

International Search Report and Written Opinion—PCT/CN2019/092033—ISA/EPO—dated Sep. 27, 2019.

International Search Report and Written Opinion—PCT/CN2018/092216—ISA/EPO—dated Feb. 28, 2019.

NTT DOCOMO:"Non-linear Precoding for NR", 3GPP TSG RAN WG1 Meeting #88, 3GPP Draft; R1-1702848, Athens, Greece; Feb. 13, 2017-Feb. 17, 2017, Feb. 17, 2017 (Feb. 17, 2017), pp. 1-6, URL: https://www.3gpp.org/ftp/tsg_ran/WG1_RL1/TSGR1_88/Docs/R1-1702848.zip.

Supplementary European Search Report—EP19823000—Search Authority—Munich—dated Feb. 28, 2022.

* cited by examiner

SIGNALING DESIGN FOR NON-LINEAR PRECODING SCHEMES

CROSS REFERENCES

The present Application is a 371 national phase filing of International Patent Application No. PCT/CN2019/092033 by HAO et. al., entitled "SIGNALING DESIGN FOR NON-LINEAR PRECODING SCHEMES," filed Jun. 20, 2019; and to International Patent Application No. PCT/CN2018/092216 by HAO et. al., entitled "SIGNALING DESIGN FOR NON-LINEAR PRECODING SCHEMES," filed Jun. 21, 2018, each of which is assigned to the assignee hereof, and each of which is hereby incorporated by reference herein in its entirety.

BACKGROUND

The following relates generally to wireless communications, and more specifically to signaling design for non-linear precoding schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as NR or millimeter wave (mmW) systems, a base station may communicate with a UE using a scheme for multiple user transmission. Multiple user transmission may include a transmission from a base station supporting more than one UE simultaneously using the same frequency band. Current techniques for performing wireless communications in wireless communications systems, in certain instances, are sensitive to spatial separation between different UEs. Thus, it may be challenging to perform wireless communications with certain UEs located spatially close to each other in certain systems based on the lack of orthogonality between various transmissions. Therefore improved techniques for communicating may be desired.

SUMMARY

The described techniques relate to improved methods, systems, devices, and apparatuses that support signaling design for non-linear precoding schemes. In some communications systems, such as new radio (NR) or millimeter wave (mmW) systems, base stations may be configured to communicate with spatially co-located user equipment (UEs). In some cases, the base station may use a linear precoding scheme for communicating with the UEs. Some linear precoding schemes, however, are sensitive to spatial separation or the lack of such separation of UEs (e.g., in UE-dense areas or venues such as industrial applications, stadiums, concerts, and other places). Thus, to support high-load networks with spatially co-located or spatially close UEs, there exists a need for a base station to use improved precoding schemes, including using varying techniques such as non-linear precoding, to provide distinct advantages.

In some examples, a UE may be configured to receive a configuration associated with a layer to reference signal port mapping from a base station. A base station may determine a layer to reference signal port mapping and may determine a configuration associated with the layer to reference signal port mapping. The base station may transmit the configuration using a transmit antenna. Upon receiving the configuration, the UE may identify that at least one layer of a set of layers for receiving a downlink transmission from the base station is adapted (e.g., perturbed) based on at least one interference layer. For example, the UE may determine a number of non-linear precoding layers that are adapted by at least one interference layer. In some cases, the UE may identify whether each non-linear precoding layer is adapted (e.g., perturbed) by one or more interference layer and the UE may further identify that each interference layer is scaled by an adaptation (e.g., perturbation) factor. Thus, according to one or more aspects of the present disclosure, based on the identified layer to reference signal port mapping, the UE may be configured to effectively decode a downlink transmission.

A method of wireless communications at a UE is described. The method may include receiving, from a base station, a configuration associated with a layer to reference signal port mapping, identifying, based on the configuration, that at least one layer of a set of layers for receiving a downlink transmission from the base station is adapted based on at least one interference layer, where the adapted layer is mapped to one or more reference signal ports, receiving the downlink transmission, and decoding the downlink transmission based on identifying that the at least one layer is adapted and the layer to reference signal port mapping.

An apparatus for wireless communications at a UE is described. The apparatus may include a processor, memory in electronic communication with the processor, and instructions stored in the memory. The instructions may be executable by the processor to cause the apparatus to receive, from a base station, a configuration associated with a layer to reference signal port mapping, identify, based on the configuration, that at least one layer of a set of layers for receiving a downlink transmission from the base station is adapted based on at least one interference layer, where the adapted layer is mapped to one or more reference signal ports, receive the downlink transmission, and decode the downlink transmission based on identifying that the at least one layer is adapted and the layer to reference signal port mapping.

Another apparatus for wireless communications at a UE is described. The apparatus may include means for receiving, from a base station, a configuration associated with a layer to reference signal port mapping, identifying, based on the configuration, that at least one layer of a set of layers for receiving a downlink transmission from the base station is adapted based on at least one interference layer, where the adapted layer is mapped to one or more reference signal ports, receiving the downlink transmission, and decoding the downlink transmission based on identifying that the at least one layer is adapted and the layer to reference signal port mapping.

A non-transitory computer-readable medium storing code for wireless communications at a UE is described. The code may include instructions executable by a processor to receive, from a base station, a configuration associated with a layer to reference signal port mapping, identify, based on the configuration, that at least one layer of a set of layers for receiving a downlink transmission from the base station is adapted based on at least one interference layer, where the adapted layer is mapped to one or more reference signal ports, receive the downlink transmission, and decode the downlink transmission based on identifying that the at least one layer is adapted and the layer to reference signal port mapping.

Some examples of the method, apparatuses, and non-transitory computer-readable medium described herein may further include operations, features, means, or instructions for receiving, from the base station, a second configuration associated with a first set of reference signal ports and a second set of reference signal ports, identifying, based on the second configuration, that the at least one layer may be mapped to at least one reference signal port of the first set of reference signal ports, and that an adaptation of the at least one layer may be associated with at least one reference signal port of the second set of reference signal ports and receiving the first set of reference signal ports and the second set of reference signal ports.

Some examples of the method, apparatuses, and non-transitory computer-readable medium described herein may further include operations, features, means, or instructions for identifying, a relationship between ports of the first set of reference signal ports and ports of the second set of reference signal ports and determining the adaptation of the at least one layer associated with the at least one reference signal port of the second set of reference signal ports based on the relationship.

Some examples of the method, apparatuses, and non-transitory computer-readable medium described herein may further include operations, features, means, or instructions for identifying the relationship may be based on a preconfigured rule.

In some examples of the method, apparatuses, and non-transitory computer-readable medium described herein, identifying the relationship may be based on the preconfigured rule further may include operations, features, means, or instructions for identifying the relationship between the ports of the first set of reference signal ports and the ports of the second set of reference signal ports based on one or more indices of the ports of the first set of reference signal ports and the ports of the second set of reference signal ports.

Some examples of the method, apparatuses, and non-transitory computer-readable medium described herein may further include operations, features, means, or instructions for receiving, from the base station, a third configuration identifying the relationship between the ports of the first set of reference signal ports and the ports of the second set of reference signal ports, where determining the adaptation of the at least one layer associated with the at least one reference signal port of the second set of reference signal ports may be based on the third configuration.

In some examples of the method, apparatuses, and non-transitory computer-readable medium described herein, receiving the third configuration further may include operations, features, means, or instructions for receiving a set of candidate relationships using a higher layer signaling and receiving a set of bits in a downlink control indicator indicating a use of a candidate relationship from the set of candidate relationships.

Some examples of the method, apparatuses, and non-transitory computer-readable medium described herein may further include operations, features, means, or instructions for determining a measurement of a channel associated with the downlink transmission based on the at least one port of the first set of reference signal ports, where determining the adaptation of the at least one layer associated with the at least one reference signal port of the second set of reference signal ports may be based on the measurement of the channel.

In some examples of the method, apparatuses, and non-transitory computer-readable medium described herein, the first set of reference signal ports and the second set of reference signal ports include demodulation reference signal ports.

In some examples of the method, apparatuses, and non-transitory computer-readable medium described herein, a configuration associated with the second set of reference signal ports may be based on at least one of a precoder granularity, a density of the ports, a frequency occupancy, a time occupancy, a code division multiplexing (CDM) type, or any combination thereof, and where the configuration associated with the second set of reference signal ports may be different from a configuration associated with the first set of reference signal ports.

In some examples of the method, apparatuses, and non-transitory computer-readable medium described herein, the first set of reference signal ports and the second set of reference signal ports may have a same configuration.

In some examples of the method, apparatuses, and non-transitory computer-readable medium described herein, the second set of reference signal ports includes a dedicated channel used for determining an adaptation.

Some examples of the method, apparatuses, and non-transitory computer-readable medium described herein may further include operations, features, means, or instructions for receiving a configuration associated with the second set of reference signal ports, where the configuration includes at least one of a precoder granularity, a density of the ports, a frequency occupancy, a time occupancy, a CDM type, or any combination thereof.

Some examples of the method, apparatuses, and non-transitory computer-readable medium described herein may further include operations, features, means, or instructions for receiving, from the base station, a second configuration to identify the at least one interference layer associated with the at least one layer, where an adaptation may be based on the at least one interference layer.

Some examples of the method, apparatuses, and non-transitory computer-readable medium described herein may further include operations, features, means, or instructions for identifying a relationship between the at least one interference layer and ports of the second set of reference signal ports and determining the adaptation of the at least one layer may be based on the identification.

Some examples of the method, apparatuses, and non-transitory computer-readable medium described herein may further include operations, features, means, or instructions for identifying the relationship may be based on a preconfigured rule.

Some examples of the method, apparatuses, and non-transitory computer-readable medium described herein may further include operations, features, means, or instructions for identifying the relationship between the ports of the first set of reference signal ports and the ports of the second set of reference signal ports may be based on one or more indices of the ports of the first set of reference signal ports and the ports of the second set of reference signal ports.

Some examples of the method, apparatuses, and non-transitory computer-readable medium described herein may further include operations, features, means, or instructions for receiving a third configuration to identify the relationship between the at least one interference layer and ports of the second set of reference signal ports.

Some examples of the method, apparatuses, and non-transitory computer-readable medium described herein may further include operations, features, means, or instructions for transmitting, to the base station, capability information associated with the at least one layer, where at least one of the configuration, the second configuration or the third configuration may be based on the capability information.

In some examples of the method, apparatuses, and non-transitory computer-readable medium described herein, the capability information includes a capability to support a number of adapted layers, a capability to support a number of interference layers associated with a number of adapted layers, or both.

In some examples of the method, apparatuses, and non-transitory computer-readable medium described herein, receiving at least one of the configuration, the second configuration, or the third configuration further may include operations, features, means, or instructions for receiving, from the base station, one or more configurations via one or more fields of a downlink control indicator, or receiving, from the base station, the configuration in a downlink control indicator format, where the configuration may be based on the capability information.

Some examples of the method, apparatuses, and non-transitory computer-readable medium described herein may further include operations, features, means, or instructions for receiving an indication identifying one or more candidate combinations of any two of the configurations of layer to port mapping, the second configuration associated with the first set of reference signal ports and the second set of reference signal ports, the third configuration identifying the relationship of the first set of reference signal ports and the second set of reference signal ports, the second configuration associated with the identification of the at least one interference layers, and the third configuration associated with the relationship between the at least one interference layers and the ports of the second set of reference signal ports and determining the adaptation of the at least one layer based on the indication identifying one or more candidate combinations of any two of the configurations of layer to port mapping.

Some examples of the method, apparatuses, and non-transitory computer-readable medium described herein may further include operations, features, means, or instructions for identifying at least two candidate combinations based on the indication, receiving a second indication identifying a selected candidate combination of configurations and determining the adaptation of the at least one layer based on the second indication.

Some examples of the method, apparatuses, and non-transitory computer-readable medium described herein may further include operations, features, means, or instructions for receiving the indication and the second indication via an RRC, a medium access control layer control element, a downlink control indicator, or a combination thereof.

In some examples of the method, apparatuses, and non-transitory computer-readable medium described herein, the at least one layer may be adapted by subtracting a product of the at least one interference layer and at least one perturbation factor, and where determining an adaptation further includes determining the at least one perturbation factor.

Some examples of the method, apparatuses, and non-transitory computer-readable medium described herein may further include operations, features, means, or instructions for determining a second set of reference signal ports, where the second set of reference signal ports may be transmitted using at least the perturbation factor.

In some examples of the method, apparatuses, and non-transitory computer-readable medium described herein, a signal resulting from subtracting the product of the at least one interference layer and at least one perturbation factor may be modified using a non-linear operator.

In some examples of the method, apparatuses, and non-transitory computer-readable medium described herein, the non-linear operator includes a modulo operator. In some examples of the method, apparatuses, and non-transitory computer-readable medium described herein, the set of layers includes an adapted layer and a non-adapted layer.

In some examples of the method, apparatuses, and non-transitory computer-readable medium described herein, the adapted layer and the non-adapted layer may be associated with a same codeword. In some examples of the method, apparatuses, and non-transitory computer-readable medium described herein, the adapted layer and the non-adapted layer may be associated with different codewords.

A method of wireless communications at a base station is described. The method may include determining that at least one layer of a set of layers of a downlink transmission is adapted based on at least one interference layer, and that the at least one adapted layer is mapped to a reference signal port, transmitting, to a UE, a configuration associated with a layer to reference signal port mapping based on the determining, and transmitting the downlink transmission to the UE based on the configuration.

An apparatus for wireless communications at a base station is described. The apparatus may include a processor, memory in electronic communication with the processor, and instructions stored in the memory. The instructions may be executable by the processor to cause the apparatus to determine that at least one layer of a set of layers of a downlink transmission is adapted based on at least one interference layer, and that the at least one adapted layer is mapped to a reference signal port, transmit, to a UE, a configuration associated with a layer to reference signal port mapping based on the determining, and transmit the downlink transmission to the UE based on the configuration.

Another apparatus for wireless communications at a base station is described. The apparatus may include means for determining that at least one layer of a set of layers of a downlink transmission is adapted based on at least one interference layer, and that the at least one adapted layer is mapped to a reference signal port, transmitting, to a UE, a configuration associated with a layer to reference signal port mapping based on the determining, and transmitting the downlink transmission to the UE based on the configuration.

A non-transitory computer-readable medium storing code for wireless communications at a base station is described. The code may include instructions executable by a processor to determine that at least one layer of a set of layers of a downlink transmission is adapted based on at least one interference layer, and that the at least one adapted layer is mapped to a reference signal port, transmit, to a UE, a configuration associated with a layer to reference signal port mapping based on the determining, and transmit the downlink transmission to the UE based on the configuration.

Some examples of the method, apparatuses, and non-transitory computer-readable medium described herein may further include operations, features, means, or instructions for determining a first set of reference signal ports and a second set of reference signal ports, where the at least one adapted layer may be mapped to at least one reference signal port of the first set of reference signal ports, and that an adaptation may be associated with at least one reference signal port of the second set of reference signal ports, transmitting the first set of reference signal ports and the second set of reference signal ports to the UE and transmitting a second configuration associated with a first set of reference signal ports and a second set of reference signal ports.

Some examples of the method, apparatuses, and non-transitory computer-readable medium described herein may further include operations, features, means, or instructions for determining a relationship between ports of the first set of reference signal ports and ports of the second set of reference signal ports, determining the adaptation of the at least one layer associated with the at least one reference signal port of the second set of reference signal ports based on the relationship and transmitting the first set of reference signal ports and the second set of reference signal ports based on the determining.

Some examples of the method, apparatuses, and non-transitory computer-readable medium described herein may further include operations, features, means, or instructions for determining one or more indices of the ports of the first set of reference signal ports and the ports of the second set of reference signal ports, where the relationship between the ports of the first set of reference signal ports and the ports of the second set of reference signal ports may be based on one or more indices of the ports of the first set of reference signal ports and the ports of the second set of reference signal ports and transmitting the first set of reference signal ports and the second set of reference signal ports based on the determining.

Some examples of the method, apparatuses, and non-transitory computer-readable medium described herein may further include operations, features, means, or instructions for transmitting, to the UE, a third configuration identifying the relationship between the ports of the first set of reference signal ports and the ports of the second set of reference signal ports, where determining the adaptation of the at least one layer associated with the at least one reference signal port of the second set of reference signal ports may be based on the third configuration.

In some examples of the method, apparatuses, and non-transitory computer-readable medium described herein, transmitting the third configuration further may include operations, features, means, or instructions for transmitting a set of candidate relationships using a higher layer signaling and transmitting a set of bits in a downlink control indicator indicating a use of a candidate relationship from the set of candidate relationships.

Some examples of the method, apparatuses, and non-transitory computer-readable medium described herein may further include operations, features, means, or instructions for identifying at least one interference layer associated with the at least one adapted layer of the UE and identifying a relationship between the adaptation and the at least one interference layer, where transmitting the configuration includes transmitting the configuration indicating the relationship between the adaptation and the at least one interference layer.

In some examples of the method, apparatuses, and non-transitory computer-readable medium described herein, the first set of reference signal ports and the second set of reference signal ports may be demodulation reference signal ports.

In some examples of the method, apparatuses, and non-transitory computer-readable medium described herein, a configuration associated with the second set of reference signal ports may be based on at least one of a precoder granularity, a density of the ports, a frequency occupancy, a time occupancy, a CDM type, or any combination thereof, and where the configuration associated with the second set of reference signal ports may be different from a configuration associated with the first set of reference signal ports.

In some examples of the method, apparatuses, and non-transitory computer-readable medium described herein, the first set of reference signal ports and the second set of reference signal ports may have a same configuration.

In some examples of the method, apparatuses, and non-transitory computer-readable medium described herein, the second set of reference signal ports includes a dedicated channel for determining the adaptation.

Some examples of the method, apparatuses, and non-transitory computer-readable medium described herein may further include operations, features, means, or instructions for transmitting a configuration associated with the second set of reference signal ports, where the configuration includes at least one of a precoder granularity, a density of the ports, a frequency occupancy, a time occupancy, a CDM type, or any combination thereof.

In some examples of the method, apparatuses, and non-transitory computer-readable medium described herein, the at least one layer may be adapted by subtracting a product of the at least one interference layer and at least one perturbation factor, where determining the adaptation further includes determining the at least one perturbation factor.

Some examples of the method, apparatuses, and non-transitory computer-readable medium described herein may further include operations, features, means, or instructions for transmitting the second set of reference signal ports based on the at least one perturbation factor.

In some examples of the method, apparatuses, and non-transitory computer-readable medium described herein, a signal resulting from subtracting the product of the at least one interference layer and at least one perturbation factor may be modified using a non-linear operator. In some examples of the method, apparatuses, and non-transitory computer-readable medium described herein, the non-linear operator includes a modulo operator.

Some examples of the method, apparatuses, and non-transitory computer-readable medium described herein may further include operations, features, means, or instructions for transmitting, to the UE, a second configuration to identify the at least one interference layer associated with the at least one layer, where an adaptation may be based on the at least one interference layer.

Some examples of the method, apparatuses, and non-transitory computer-readable medium described herein may further include operations, features, means, or instructions for transmitting a third configuration to identify the relationship between the at least one interference layer and ports of the second set of reference signal ports, where the relationship between the ports of the first set of reference signal ports and the ports of the second set of reference signal ports may be based on one or more indices of the ports of the first set of reference signal ports and the ports of the second set of reference signal ports.

Some examples of the method, apparatuses, and non-transitory computer-readable medium described herein may further include operations, features, means, or instructions for receiving, from the UE, capability information associated with the at least one layer and determining at least one of the configuration, the second configuration or the third configuration based on the capability information.

In some examples of the method, apparatuses, and non-transitory computer-readable medium described herein, the capability information including a capability to support a number of adapted layers, a capability to support a number of interference layers associated with a number of adapted layers, or both.

In some examples of the method, apparatuses, and non-transitory computer-readable medium described herein, transmitting at least one of the configuration, the second configuration, or the third configuration further may include operations, features, means, or instructions for transmitting, to the UE, one or more configurations via one or more fields of a downlink control indicator, or transmitting, to the UE, the configuration in a downlink control indicator format, where the configuration may be based on the capability information.

Some examples of the method, apparatuses, and non-transitory computer-readable medium described herein may further include operations, features, means, or instructions for transmitting an indication identifying one or more candidate combinations of any two of the configurations of layer to port mapping, the second configuration associated with the first set of reference signal ports and the second set of reference signal ports, the third configuration identifying the relationship of the first set of reference signal ports and the second set of reference signal ports, the second configuration associated with the identification of the at least one interference layers, and the third configuration associated with the relationship between the at least one interference layers and the ports of the second set of reference signal ports, where determining the adaptation of the at least one layer may be based on the indication identifying one or more candidate combinations of any two of the configurations of layer to port mapping.

Some examples of the method, apparatuses, and non-transitory computer-readable medium described herein may further include operations, features, means, or instructions for transmitting a second indication identifying a selected candidate combination of configurations, where determining the adaptation of the at least one layer may be based on the second indication.

Some examples of the method, apparatuses, and non-transitory computer-readable medium described herein may further include operations, features, means, or instructions for transmitting the indication and the second indication via an RRC, a medium access control layer control element, a downlink control indicator, or a combination thereof.

In some examples of the method, apparatuses, and non-transitory computer-readable medium described herein, the set of layers include an adapted layer and a non-adapted layer. In some examples of the method, apparatuses, and non-transitory computer-readable medium described herein, the adapted layer and the non-adapted layer may be associated with a same codeword.

In some examples of the method, apparatuses, and non-transitory computer-readable medium described herein, the adapted layer and the non-adapted layer may be associated with different codewords.

DETAILED DESCRIPTION

Figure 1:
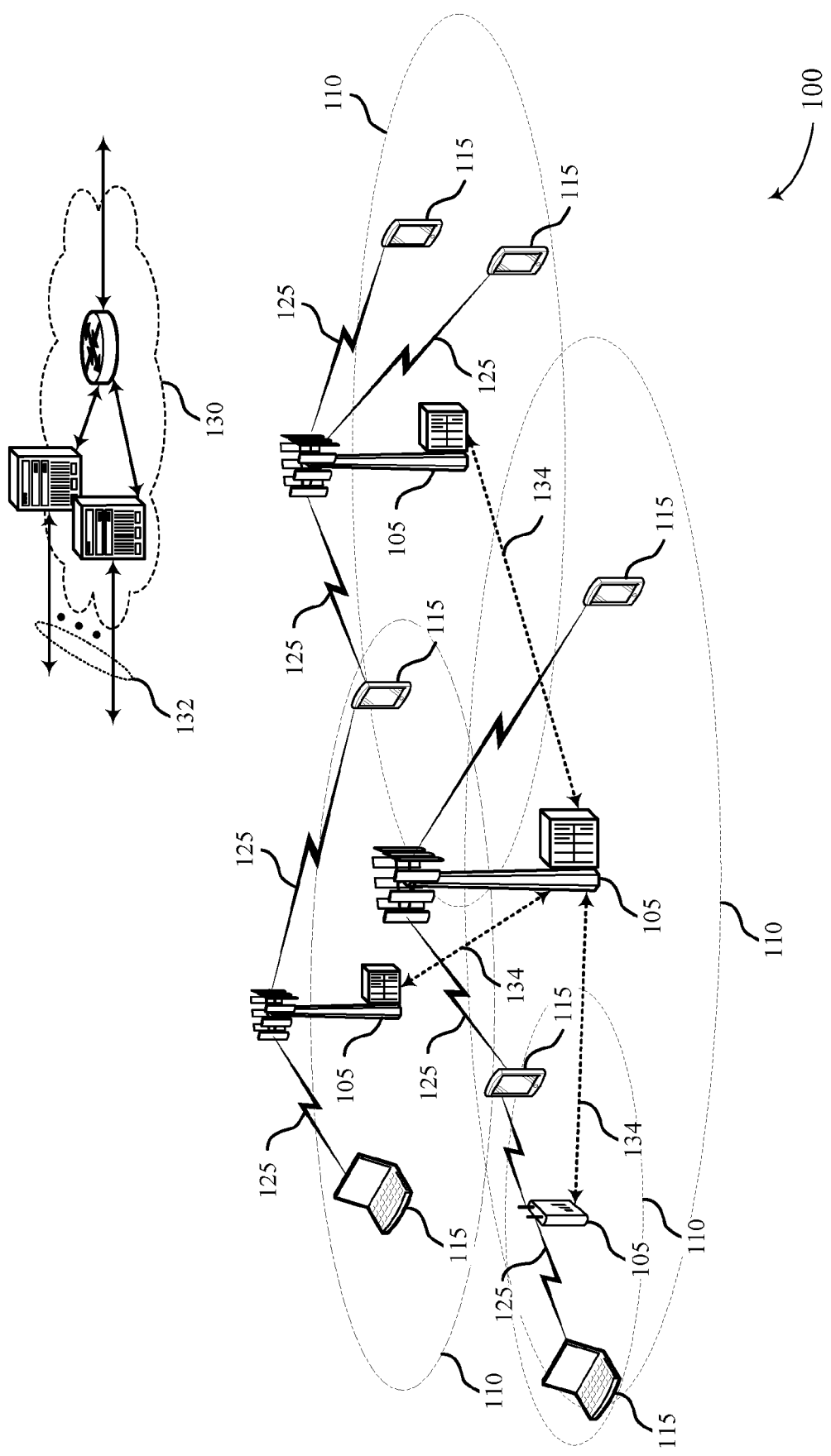
FIG. 1 illustrates an example of a system for wireless communications that supports signaling design for non-linear precoding schemes in accordance with aspects of the present disclosure.

Wireless communications systems, such as new radio (NR) or millimeter wave (mmW) systems, may include base stations configured to communicate with spatially co-located user equipment (UEs) or other UEs that operate in UE-dense areas or high-load implementations. In some cases, the base station may use a transmission scheme for supporting more than one UE simultaneously using the same frequency band. In some examples, the base station may use a linear precoding scheme for communicating with multiple UEs in the same frequency band. Linear precoding schemes may be sensitive to spatial separation of UEs, particularly when such separation is minimal, which leads to less effective and less efficient communications. Thus, to support high-load networks with spatially co-located UEs, there may exists a need for a base station to use different precoding schemes.

In some cases, different precoding schemes may include a non-linear precoding scheme. The base station may estimate an interference for one or more UEs in a group of spatially co-located UEs and may transmit an encoded signal to the UEs based on the estimated interference. There exists a need for the UE to determine the interference (such as a perturbation factor) and/or one or more indices associated with one or more non-linear precoding layers.

According to various aspects of the present disclosure, a UE may be configured to receive a configuration associated with a layer to reference signal port mapping from a base station. A base station may determine a layer to reference signal port mapping and may further determine a configuration associated with the layer to reference signal port mapping. The base station may then transmit the configuration. In some cases, the base station may transmit the configuration via one or more fields (e.g., via one or more fields of a downlink control indicator (DCI)). In some cases, the base station may transmit the configuration in a dedicated format (e.g., a dedicated DCI format). In some cases, the base station may determine the configuration based on capability information of the UE. In such cases, the UE may report capability information to the base station. For example, the capability information may include a capability to support a number of adapted layers, a capability to support a number of interference layers associated with a number of adapted layers, or both.

In some cases, a receiver (e.g., the UE) may determine a number of non-linear precoding layers adapted by an interference layer. In some cases, the UE may identify that at least one layer (such as a non-linear precoding layer) of a set of layers for receiving a downlink transmission from the base station is adapted based on at least one interference layer. In some examples, the base station may indicate the interference layers to the UE. Thus, in a non-linear precoding scheme, the receiver (e.g., the UE) may identify whether each non-linear precoding layer is adapted (such as perturbed) by one or more interference layers and the receiver may further identify that each interference layer is scaled by a perturbation factor. In some cases, the receiver may further determine that the adapted layer is mapped to one or more reference signal ports. In some cases, the UE may utilize the received configuration to identify that the adapted layer is mapped to one or more reference signal ports. In some examples, the receiver may receive a downlink transmission from a base station and may decode the downlink transmission based on identifying that the at least one layer is adapted and the layer to reference signal port mapping.

Aspects of the disclosure are initially described in the context of a wireless communications system. Aspects of the disclosure are further illustrated by and described with reference to apparatus diagrams, system diagrams, and flowcharts that relate to signaling design for non-linear precoding schemes.

FIG. 1 illustrates an example of a wireless communications system 100 that supports signaling design for non-linear precoding schemes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, the base station 105 may determine that at least one layer of a set of layers of a downlink transmission is adapted based on at least one interference layer. The base station 105 may also determine that the at least one adapted layer is mapped to a reference signal port. The base station 105 may then transmit, to a UE, a configuration associated with a layer to reference signal port mapping based on the determining. In some cases, the base station 105 may transmit the configuration via a DCI. The base station may then transmit the downlink transmission to the UE according to the configuration.

In some cases, the UE 115 may receive a configuration associated with a layer to reference signal port mapping from the base station 105. In some cases, the UE 115 may identify that at least one layer of a set of layers for receiving a downlink transmission from the base station is adapted (e.g., perturbed) based on at least one interference layer. In some cases, the UE 115 may identify the at least one adapted layer based on the configuration. In some examples, the adapted layer may be mapped to one or more reference signal ports. In some cases, the UE 115 may receive the downlink transmission from the base station 105 and the UE 115 may decode the downlink transmission based on identifying that the at least one layer is adapted and the layer to reference signal port mapping.

Figure 2:
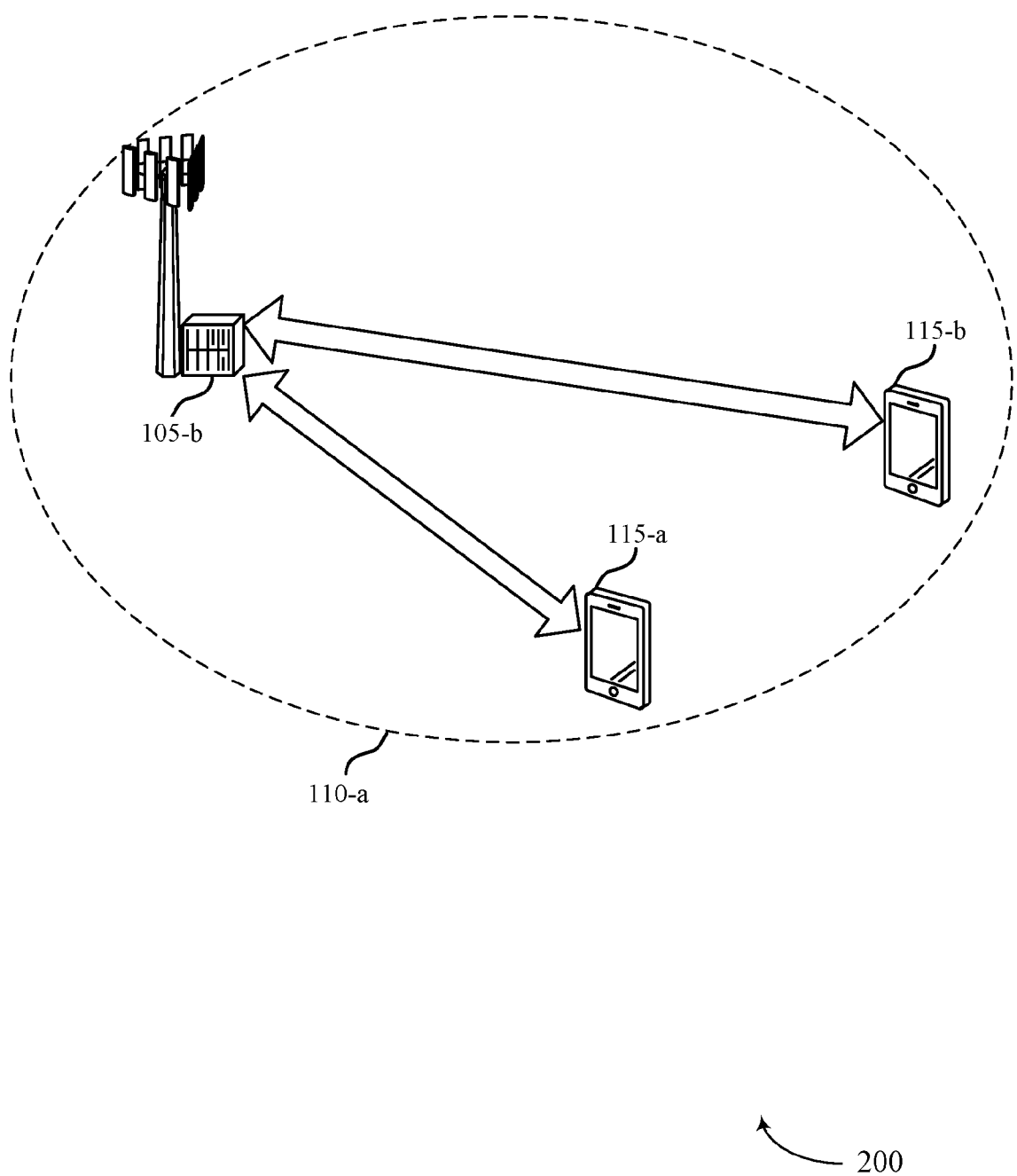
FIG. 2 illustrates an example of a wireless communications system that supports signaling design for non-linear precoding schemes in accordance with aspects of the present disclosure.

FIG. 2 illustrates an example of a wireless communications system 200 that supports signaling design for non-linear precoding schemes in accordance with aspects of the present disclosure. In some examples, the wireless communications system 200 may implement aspects of wireless communications system 100. In some examples, the wireless communications system 200 may include a base station 105-a, UE 115-a and UE 115-b, which may be examples of the corresponding devices as described with reference to FIG. 1. The UE 115-a and the UE 115-b may communicate with the base station 105-a within a coverage area 110-a.

In some examples, the base station 105-a, the UE 115-a and the UE 115-b may be configured to perform in a NR or mmW system. In some cases, the base station 105-a may be configured to perform a multiple user transmission. In some examples, the base station 105-a may perform a transmission scheme supporting more than one UE simultaneously using the same frequency band. In some examples, the base station 105-a may use a linear precoding scheme for the transmission. However, the linear precoding scheme may be sensitive to the spatial separation of UEs. In the example of FIG. 2, when the UE 115-a and the UE 115-b are located close to each other, a precoding operation related to the UE 115-a may minimize or impact its own signal in an effort to cancel interference from the other UE 115-b. Thus, for high load networks including spatially close UEs, a non-linear precoding scheme may be adapted for effective communication.

As part of a non-linear precoding scheme, the base station 105-a may determine that a layer included in a set of layers of a downlink transmission is adapted based on at least one interference layer. In some examples, the adapted layer may be mapped to a reference signal port. The base station 105-a may then determine a configuration associated with a layer to reference signal port mapping and may transmit the configuration to the UE 115-a and the UE 115-b. In some cases, the base station 105-a may transmit the configuration via one or more DCI. In some examples, each of the UE 115-a and the UE 115-b may be configured to receive the configuration, and upon receiving the configuration, each UE (e.g., UE 115-a and UE 115-b) may identify that a layer of the UE is adapted (e.g., perturbed) based on at least one interference layer. For example, the UE 115-a may identify a first adapted layer for receiving downlink transmissions, and the UE 115-b may identify a second adapted layer for receiving downlink transmissions. In some cases, each UE (such as UE 115-a and UE 115-b) may determine whether each non-linear precoding layer is adapted (e.g., perturbed) by one or more interference layer. The UEs (such as UE 115-a and UE 115-b) may further identify that each interference layer is scaled by an adaptation (e.g., perturbation) factor. Thus, according to one or more aspects of the present disclosure, using the layer to reference signal port mapping and the adaptation factor, each UE may be configured to effectively decode a downlink transmission.

Figure 3:
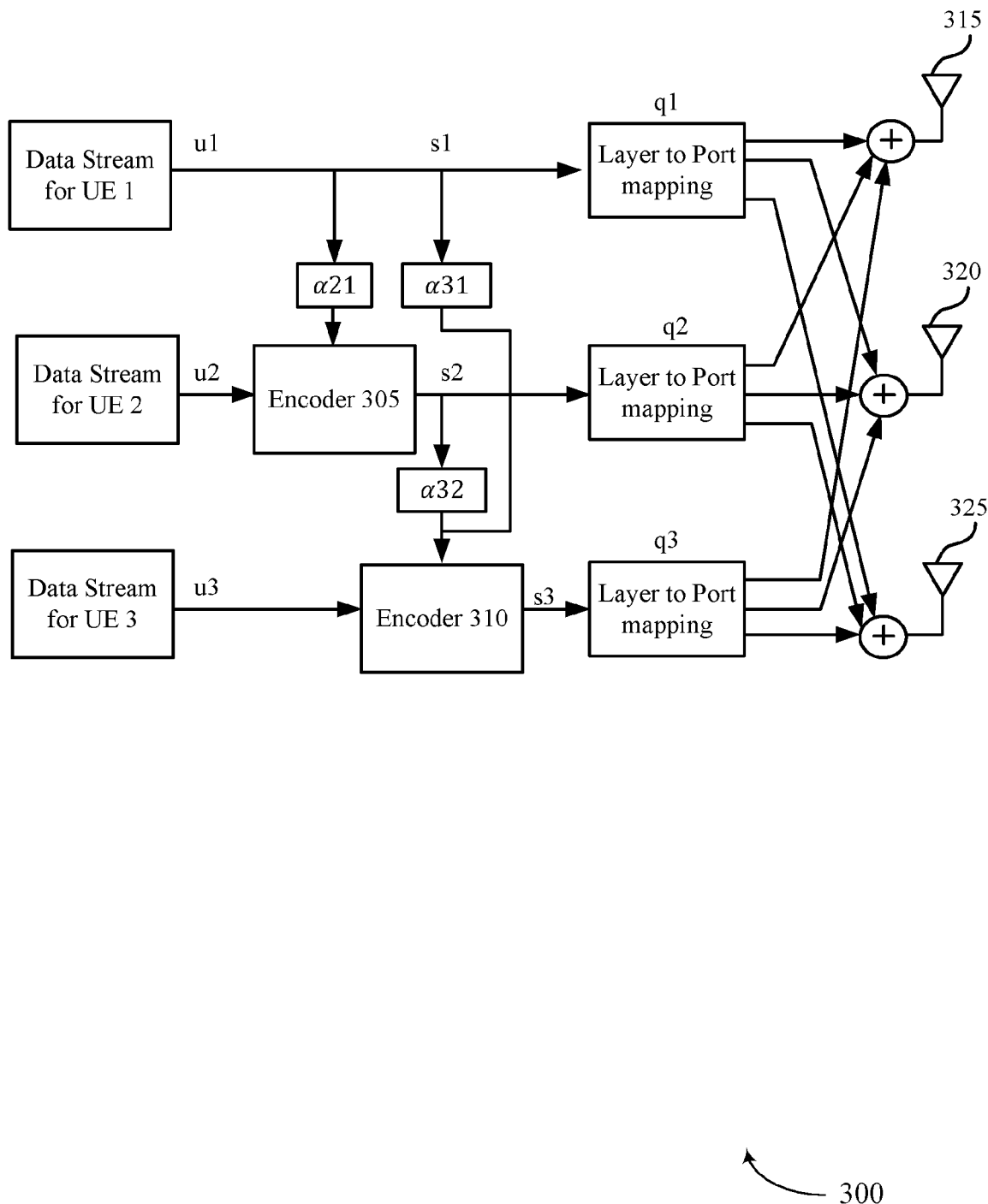
FIG. 3 illustrates an example of a precoding architecture that supports signaling design for non-linear precoding schemes in accordance with aspects of the present disclosure.

FIG. 3 illustrates an example of a precoding architecture 300 that supports signaling design for non-linear precoding schemes in accordance with aspects of the present disclosure. In some examples, the precoding architecture 300 may implement aspects of wireless communications system 100.

In the example of FIG. 3, the precoding architecture 300 may include an architecture of a non-linear precoding scheme at a base station supporting multiple UEs. In one example, the base station and the UEs may be examples of the corresponding devices as described with reference to FIGS. 1 and 2. In some examples, each UE (e.g., UE 115) may include one receive antenna. In some cases, the base station may identify data streams for each UE. For example, the base station may identify u1 as the data stream for a first UE (e.g., UE1), u2 as the data stream for a second UE (e.g., UE2), and u3 as the data stream for a third UE (e.g., UE3).

In some cases, u1, u2 and u3 may include constellation symbols to be transmitted to the corresponding UE. In the example of a conventional linear precoding, the base station may be configured to map the data stream u1 for UE1 to a precoder $q_1$ via layer to port mapping. Similarly, in case of the conventional linear precoding, the base station may map the data stream u2 for UE2 to a precoder $q_2$, and the data stream u3 for the third UE to a precoder $q_3$ via layer to port mapping. In such cases, each UE may utilize an equalizer and a demapper to identify the corresponding data stream. Specifically, each UE may utilize an equalizer and a demapper to identify a constellation symbol transmitted from the base station. In the example of FIG. 3, in the case of a linear precoder (not shown), the UE1 may identify the corresponding data stream, u1, the second UE may identify the corresponding data stream, u2, and the third UE may identify the corresponding data stream, u3.

In the example of non-linear precoding, the base station may rank each UE. For example, the base station may determine an order for each UE based on interference and/or channel state information. In one example, for the first UE, the base station may be configured to directly map the data stream u1 (e.g., signal s1) to the precoder $q_1$, and may transmit the mapping to the first UE. In case of the second UE, the base station may estimate an interference from the first UE (such as UE1). In the example of FIG. 3, based on a potential interference, the base station may adapt the data stream u2 for the second UE. For example, the base station may adapt (e.g., perturb) the data stream u2 based on the potential interference from the first UE. In some cases, a perturbation factor α may be designed based on the potential interference. For example, for the data stream u2 of the second UE, the base station may determine a product of u1 and a perturbation factor $\alpha_{21}$ and may transmit the product to an encoder 305. In some cases, the encoder 305 may be a non-linear precoding encoder. The encoder 305 may then encode the received product of u1 and the perturbation factor $\alpha_{21}$ together with the data stream u2. Additionally, the encoder 305 may output an encoded signal s2.

In case of the third UE, the base station may adapt the data stream u3 based on a potential interference. For example, the base station may perturb the data stream u3 for the third UE based on the potential interference from the first UE and the second UE. As described above, a perturbation factor α may be designed based on the potential interference from each UE. For example, for the data stream u3 of the third UE, the base station may determine a product of u1 and a perturbation factor $\alpha_{31}$ and a product of u2 and a perturbation factor $\alpha_{32}$. The base station may then transmit the products to an encoder 310. In some cases, the encoder 310 is a non-linear precoding encoder. The encoder 310 may encode the received product of u1 and a perturbation factor $\alpha_{31}$ and the product of u2 and a perturbation factor α32 together with the data stream u3. Upon successful encoding, the encoder 310 may output an encoded signal s3 for the third UE.

Thus generally, for UE(k) (i.e., a kth UE), an interference from UE(1) to UE (k−1) is cancelled by non-linear precoding. More specifically, the interference from UE(1) to UE (k−1) may be cancelled using perturbation factors (e.g., non-linear precoders) α(k,1) to α(k,k−1), and the interference from UE(k+1) to UE(k) may be cancelled by linear precoding. For example, for UE(k), the interference from UE(k+1) to UE(k) may be cancelled by linear precoders $q_{k+1}$ to $q_k$. However, such interference cancellation may cause challenges in receiver design. In some cases, there may be a need for the receiver (e.g., the receiving UE) to identify the perturbation factor and one or more indices associated with the non-linear precoding layers. The systems and methods of the present disclosure describes a layer-to-port mapping procedure. More specifically, the present disclosure relates to systems and methods to determine a perturbation factor and an association between a perturbation factor and one or more interference layers.

In some cases, a second UE (e.g., UE2) may effectively determine a perturbation factor and an association between the perturbation factor and one or more interference layers by identifying $\alpha_{21}$ and a desired channel for the second UE. Similarly, the third UE (e.g., UE3) may effectively determine a perturbation factor and an association between the perturbation factor and one or more interference layers by identifying $\alpha_{31}$ and $\alpha_{32}$, in addition to a desired channel for the third UE. In some cases, a UE may be configured with more than one layer. In cases where each UE is configured with two layers, then each layer may be perturbed using one perturbation factor.

More specifically, if the second UE is configured with two layers, then the second UE may effectively determine a perturbation factor and an association between the perturbation factor and one or more interference layers by identifying a first perturbation factor and a second perturbation factor in addition to the desired channel. In one example, a UE may be configured with two non-linear precoding layers, where each non-linear precoding layer may be adapted (e.g., perturbed) by two interference layers. In such cases, the UE may be configured to determine four perturbation factors (e.g., one perturbation factor for each layer). In one example, a total number of perturbation factors calculated by a UE may be determined as a product of a number of non-linear precoding layers and a number of interference layers used to adapt the non-linear precoding layers.

According to various aspects of the present disclosure, a UE may be configured to receive a configuration associated with a layer to reference signal port mapping from a base station. A base station may determine a layer to reference signal port mapping (such as $q_1$, $q_2$, and $q_3$) and may further determine a configuration associated with the layer to reference signal port mapping. The base station may then transmit the configuration using a transmit antenna (e.g., transmit antennae 315, 320 and 325). In some cases, the receiver (e.g., the UE) may determine a number of non-linear precoding layers adapted by an interference layer. In some cases, the UE may identify that at least one layer (e.g., a non-linear precoding layer) of a set of layers for receiving a downlink transmission from the base station is adapted based on at least one interference layer. For example, a UE may configure a non-linear precoding layer (or a type-II layer), and the UE may be configured to identify that the non-linear precoding layer is perturbed by one or more interference layers. In some examples, the base station may indicate the interference layers to the receiver. Thus, in a non-linear precoding scheme, the receiver (e.g., the UE) may identify whether each non-linear precoding layer is adapted (e.g., perturbed) by one or more interference layers. The receiver may further identify that each interference layer is scaled by a perturbation factor. In some cases, the UE may determine that the adapted layer is mapped to one or more reference signal ports. In some cases, the UE may utilize the received configuration to identify that the adapted layer is mapped to one or more reference signal ports. Thus, according to one or more aspects of the present disclosure, for each non-linear precoding layer (or type-II layer), the UE may receive one or more signals to facilitate the identification of a perturbation factor associated with each interference layer.

In some cases, the receiver (e.g., the UE) may be configured or signaled to identify the perturbation factor associated with each interference layer and each desired layer (e.g., each non-linear precoding layer/type-II layer). In some cases, the UE may determine an adaptation based on determining the perturbation factor.

In one example, each UE may be configured with a predetermined number of ports for measuring the perturbation factors. In some cases, a UE may be configured with a first set of reference signal ports and a second set of reference signal ports. In some cases, the UE may determine an adaptation (e.g., perturbation factor) associated with a reference signal port of the second set of reference signal ports based on a relationship between the ports of the first set of reference signal ports and the ports of the second set of reference signal ports. For example, the receiver (e.g., UE) may be configured with a first set of desired channel ports and a second set of dedicated channel ports. In some cases, the first set of desired channel ports and a second set of dedicated channel ports may be demodulated reference signal (DMRS) ports. In some cases, the UE may be configured to determine a perturbation factor jointly using the first set of reference signal ports and the second set of reference signal ports. In some examples, a UE may determine a value associated with a precoder using a first set of reference signal ports. Additionally, the second set of reference signal ports may be transmitted as a product of a precoder and the perturbation factor. In such cases, the UE may be configured to determine the value associated with the precoder using the first set of reference signal ports. The UE may then divide the second set of reference signal ports by the first set of reference signal ports to determine the perturbation factor. In some examples, a UE may be configured with a set of DMRS ports (such as a first set of reference signal ports) used for channel measurement, e.g., $h_k q_k$. In some cases, the UE may be configured with another set of ports of a dedicated channel (e.g., a second set of reference signal ports) used for measure of a perturbation factor (e.g., $\alpha_{kj}$) associated with the channel. In some cases, the second set of reference signal ports can be a set of DMRS ports separate from the first set of reference signal ports. In some examples, a configuration associated with the second set of reference signal ports may be based on at least one of a precoder granularity, a density of the ports, a frequency occupancy, a time occupancy, a code division multiplexing (CDM) type, a frequency/time occupancy, or any combination thereof. In some cases, the density may refer to a subcarrier spacing between two reference signal tones in frequency domain. In some cases, the frequency occupancy may refer to the subcarriers that have reference signals. In some cases, the time occupancy may refer to the OFDM symbols that have reference signals. In some examples, the UE may be configured to determine that the configuration associated with the second set of reference signal ports is different from a configuration associated with the first set of reference signal ports.

In some examples, the UE may be configured to assume that a reference signal port of the second set of reference signal ports may be obtained by a corresponding perturbation factor and a channel measured using the first set of reference signal ports. Thus, a UE may be configured to estimate the corresponding perturbation factor using the first set of reference signal ports and the corresponding port of the second set of reference signal ports.

In some examples of downlink channel designs, a first UE (e.g., UE1) may include a linear precoding layer (such as type-I layer), a second UE (e.g., UE2) may include a non-linear precoding layer (e.g., type-II layer), and a third UE may include a non-linear precoding layer (e.g., type-II layer). In such cases, for the first UE, the linear precoding layer (e.g., type-I layer) may be mapped to DMRS port0. The first UE may determine the desired layer is directly mapped to DMRS port0. In some cases, the second UE may determine that the non-linear precoding layer (or type-II layer) is mapped to DMRS port1. For example, the second UE may determine that the desired non-linear precoding layer (or type-II layer) is perturbed by (or subtracted from) the product of a perturbation factor $\alpha_{21}$ and an interference layer from UE1. The perturbed data may then go through a non-linear encoder (e.g., a modulo operator). In some cases, the output may be mapped to DMRS port1, i.e., $q_2$. Additionally, the second UE may determine a perturbation $\alpha_{21}$, mapped to reference signal port0 of a dedicated channel (e.g., a second set of reference signal ports). In some cases, the second UE may determine that mapping to the reference signal port0 of a dedicated channel as $\alpha_{21} q_2$. The second UE may determine the perturbation $\alpha_{21}$ using $q_2$ and $\alpha_{21} q_2$. Similarly, in another example, the third UE may determine the DMRS port from receiving the layer to port mapping $q_3$. In some cases, the third UE may determine that a desired non-linear precoding layer (or type-II layer) is perturbed by (or subtracted from) the product of a perturbation factor $\alpha_{31}$ and an interference layer from UE1, and the product of a perturbation factor $\alpha_{32}$ and an interference layer from UE2. The third UE may then determine that the perturbed data goes through a non-linear encoder (e.g., a modulo operator), and the output is mapped to DMRS port2, i.e., $q_3$. Additionally, the third UE may determine a perturbation $\alpha_{31}$, mapped to reference signal port 1 of a dedicated channel (e.g., the second set of reference signal ports) and a perturbation $\alpha_{32}$, mapped to reference signal port2 of a dedicated channel. In some cases, the third UE may determine that mapping to the reference signal port 1 of a dedicated channel as $\alpha_{31} q_3$ and that mapping to the reference signal port 2 of a dedicated channel as $\alpha_{32} q_3$. The third UE (e.g., UE3) may determine the perturbation $\alpha_{31}$ using $q_3$ and $\alpha_{31} q_3$ and the perturbation $\alpha_{32}$ using $q_3$ and $\alpha_{32} q_3$.

In some examples, the base station may transmit a configuration to the UE, the configuration identifying an association between the first set of reference signal ports and the second set of reference signal ports. In some examples, a UE may include two non-linear precoding layers (or type-II layers). In some cases, the UE may determine that each non-linear precoding layer is adapted by two interference layers. In such cases, as previously discussed, the UE may determine four perturbation factors. In order to determine the perturbation factors, the UE may determine two reference signal ports in the first set of reference signal ports (e.g., port 1.1 and port 1.2). In some cases, the UE may be configured to receive four reference signal ports in the second set of reference signal ports (e.g., port 2.1, 2.2, 2.3, and 2.4). According to one or more aspects of this disclosure, the UE may receive a configuration to identify that reference signal ports 2.1 and 2.2 are used to measure the perturbation factor associated with reference signal port 1.1, and reference signal ports 2.3 and 2.4 are used to measure the perturbation factor associated with the reference signal port 1.2.

In some cases, the UE may identify a relationship between reference signal ports of the first set of reference signal ports and reference signal ports of the second set of reference signal ports based on one or more indices of the ports of the first set of reference signal ports and the ports of the second set of reference signal ports. More specifically, in some cases, the UE may identify an associated between the reference signal ports of the first set of reference signal ports and the reference signal ports of the second set of reference signal ports without receiving any configuration from the base station. In one example, a first half of the second set of reference signal ports may be associated with a first port of the first set of reference signal ports. Additionally, the second half of the second set of reference signal ports may be associated with a second port of the first set of reference signal ports. In some cases, a UE may be configured to be associated with two candidate mappings. According to one example, a reference signal port 1.1 may be configured to be associated with reference signal port 2.1 and reference signal port 2.2. Additionally, a reference signal port 1.2 may be configured to be associated with reference signal port 2.3 and reference signal port 2.4. Alternatively, a port 1.1 may be configured to be associated with port 2.1 and port 2.3 while reference signal port 1.2 may be configured to be associated with reference signal port 2.2 and reference signal port 2.4. In some cases, a UE may receive an indication to identify the candidate mappings. In some cases, the indication may be a 1-bit indication. In some cases, a first configuration of two candidates may be received via a medium access control layer control element (MAC CE) and/or an RRC, and the second configuration may be received via a DCI.

Additionally, in some examples, a UE may receive a configuration from the base station to identify whether a linear precoding layer (or type-I layer) and a non-linear precoding layer (or type-II layer) co-exist. In one example, the UE may identify one type I layer and two type-II layers. The UE may additionally determine that each type-II layer is perturbed by two interference layers. In such cases, the UE may determine that the UE may need to estimate four perturbation factors. In some examples, the UE may receive three reference signal ports in the first set of reference signals (e.g., port 1.1, 1.2 and port 1.3) and may receive four ports in the second set of reference signals (e.g., port 2.1, 2.2, 2.3 and 2.4). The UE may receive a configuration to identify that the reference signal port 1.1 and the reference signal port 1.2 are associated with the type-II layers, and the reference signal port 1.3 is associated with the type-I layer. Additionally, the UE may determine that the reference signal port 2.1, the reference signal port 2.2., the reference signal port 2.3, and the reference signal port 2.4 are associated with the reference signal port 1.1 and the reference signal port 1.2.

In some cases, the UE may receive a configuration from a base station identifying one or more candidate mappings. In one example, a reference signal port 1.1 may be mapped to reference signal port 2.1 and reference signal port 2.2, reference signal port 1.2 may be mapped to reference signal port 2.3 and reference signal port 2.4. Additionally, reference signal port 1.3 may be associated with a type I layer. In some cases, reference signal port 1.1 may be mapped to reference signal port 2.1 and reference signal port 2.3, while reference signal port 1.2 may be mapped to reference signal port 2.2 and reference signal port 2.4. In some cases, reference signal port 1.3 may be associated with a type I layer. According to a third example, reference signal port 1.2 may be mapped to reference signal port 2.1 and reference signal port 2.2, reference signal port 1.3 may be mapped to reference signal port 2.3 and reference signal port 2.4, while reference signal port 1.1 may be associated with a type I (e.g., linear precoding) layer. In some cases, reference signal port 1.2 may be mapped to reference signal port 2.1 and reference signal 2.3, reference signal port 1.3 may be mapped to reference signal port 2.2 and reference signal 2.4, while reference signal port 1.1 may be associated with a type I (e.g., linear precoding) layer.

In some examples, a perturbation factor may be configured to link one type-II layer with one interference layer. In such cases, a UE may receive a configuration to identify the association between the perturbation factor and the interference layers. The UE may identify one or more non-linear precoding interference ports among available reference signal ports (e.g., DMRS ports). In some cases, the UE may identify the non-linear precoding interference ports associated with each desired type-II layer and may identify an association between the perturbation factors and the non-linear precoding interference ports for each desired type-II layer. In one example, a UE may include two non-linear precoding layers (or type-II layers), and each non-linear precoding layer may be adapted by two interference layers. In such cases, the UE may determine four perturbation factors. The UE may receive two reference signal ports in the first set of reference signal ports (e.g., port 1.1 and port 1.2). The UE may further receive four reference signal ports in the second set of reference signal ports (e.g., ports 2.1, 2.2, 2.3, and 2.4). In some cases, the UE may be configured to identify that there is a total of interference layer reference signal ports (e.g., ports 1.3, 1.4, 1.5, and 1.6).

In some examples, the UE may receive a configuration to identify that reference signal port 1.3 and reference signal port 1.4 are used to perturb the desired type-II layers (e.g., reference signal port 1.1 and reference signal port 1.2). In some cases, the UE may identify that there are four interference layers, such as 1.3, 1.4, 1.5, and 1.6. The UE may identify interference layer 1.3 perturbs reference signal port 1.1 and interference layer 1.4 perturbs reference signal port 1.2. In such cases, the UE may use a bitmap (e.g., "1 1 0 0") to identify the perturbed reference signal ports. More specifically, the UE may identify that the first two ports among a total number of interference ports may perturb reference signal port 1.1 and reference signal port 1.2. In some cases, the UE may determine the association of interference layers, the desired type- II layers and perturbation factors following a preconfigured rule. In some cases, the UE may receive a configuration identifying the association. In such cases, the UE may use reference signal port 2.1 to measure the perturbation factor associated with the reference signal port 1.1 and the reference signal port 1.3. Additionally, the UE may use the reference signal port 2.2 to measure the perturbation factor associated with the reference signal port 1.1 and the reference signal port 1.4. The UE may further use the reference signal port 2.3 to measure the perturbation factor associated with the reference signal port 1.2 and the reference signal port 1.3. Additionally, the UE may use the reference signal port 2.4 to measure the perturbation factor associated with the reference signal port 1.2 and the reference signal port 1.4. In some examples, the UE may receive the configuration design from the base station via a new DCI format. In some cases, the configuration design may be achieved via adding new DCI field in an existing DCI format. In some cases, the UE may receive a joint configuration from the base station based on the following table (Table 1). In some cases, the UE may receive the table using a higher layer signaling. In some cases, the base station may use DCI to signal the joint configuration.

may be transmitted in a different order than the exemplary order shown, or the operations performed by the base station 105-c and the UE 115-c may be performed in different orders or at different times. Certain operations may also be left out of the process flow 400, or other operations may be added to the process flow 400.

At 405, the UE 115-c may transmit capability information signal to the base station 105-c. In some examples, the capability information may include a capability to support a number of adapted layers, a capability to support a number of interference layers associated with a number of adapted layers, or both.

At 410, the base station 105-c may determine a configuration based on the capability information. In some examples, the base station 105-c may determine that at least one layer of a set of layers of a downlink transmission is adapted based on at least one interference layer. The base

TABLE 1

| Value | First set of reference signal ports | Second set of reference signal ports | Interference Layers | Mapping |
|---|---|---|---|---|
| 0 | 1.1 | 2.1 | 3.1 | Port 2.1: perturbation factor used for perturbing 3.1 in 1.1 |
| 1 | 1.1 | 2.1 2.2 | 3.1 3.2 | Port 2.1: perturbation factor used for perturbing 3.1 in 1.1; Port 2.2: perturbation factor used for perturbing 3.2 in 1.1 |
| 2 | 1.1 | 2.1 2.2 2.3 | 3.1 3.2 3.3 | Port 2.1: perturbation factor used for perturbing 3.1 in 1.1; Port 2.2: perturbation factor used for perturbing 3.2 in 1.1; Port 2.3: perturbation factor used for perturbing 3.3 in 1.1 |
| 3 | 1.1 1.2 | 2.1 2.2 | 3.1 | Port 2.1: perturbation factor used for perturbing 3.1 in 1.1; Port 2.2: perturbation factor used for perturbing 3.1 in 1.2 |
| 4 | 1.1 1.2 | 2.1 2.2 2.3 2.4 | 3.1 3.2 | Port 2.1: perturbation factor used for perturbing 3.1 in 1.1; Port 2.2: perturbation factor used for perturbing 3.2 in 1.1; Port 2.3: perturbation factor used for perturbing 3.1 in 1.2; Port 2.4: perturbation factor used for perturbing 3.2 in 1.2 |
| 5 | 1.1 1.2 | 2.1 2.2 2.3 2.4 2.5 2.6 2.7 2.8 | 3.1 3.2 3.3 3.4 | Port 2.1: perturbation factor used for perturbing 3.1 in 1.1; Port 2.2: perturbation factor used for perturbing 3.2 in 1.1; Port 2.3: perturbation factor used for perturbing 3.3 in 1.1; Port 2.4: perturbation factor used for perturbing 3.4 in 1.1; Port 2.5: perturbation factor used for perturbing 3.1 in 1.2; Port 2.6: perturbation factor used for perturbing 3.2 in 1.2; Port 2.7: perturbation factor used for perturbing 3.3 in 1.2; Port 2.8: perturbation factor used for perturbing 3.4 in 1.2. |

In some examples, the type-I layers and the type-II layers may be associated with the same codeword. In some examples, the type-I layers and the type-II layers may be associated with different codewords. Although the UE receives separate configurations from the base station, the UE may additionally or alternatively receive a single configuration including all configurations. In some examples, prior to receiving the configuration, the UE may report capability information associated with at least one layer. In some cases, the received configuration may be based on the capability information. In some cases, the UE may report a capability to support a number of adapted layers, a capability to support a number of interference layers associated with a number of adapted layers, or both, to a base station.

Figure 4:
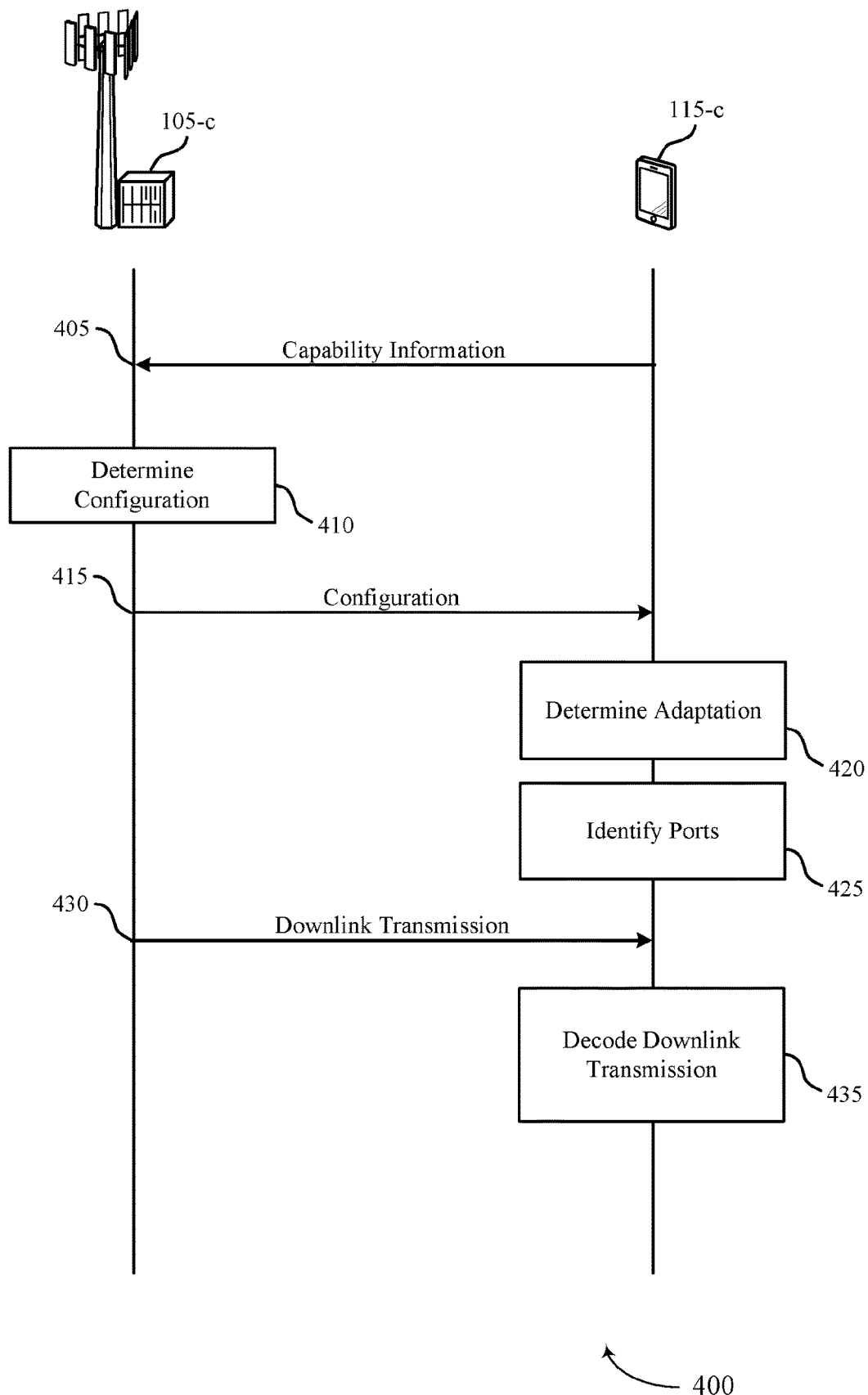
FIG. 4 illustrates an example of a process flow that supports signaling design for non-linear precoding schemes in accordance with aspects of the present disclosure.

FIG. 4 illustrates an example of a process flow 400 that supports signaling design for non-linear precoding schemes in accordance with aspects of the present disclosure. In some examples, the process flow 400 may implement aspects of the wireless communications systems 100 and 200. Base station 105-c and UE 115-c may be examples of the corresponding devices described with reference to FIGS. 1 through 3.

In the following description of the process flow 400, the operations between the base station 105-c and the UE 115-c station 105-c may further determine that the at least one adapted layer is mapped to a reference signal port.

At 415, the base station 105-c may transmit the configuration associated with a layer to reference signal port mapping based on the determining. The UE 115-c may receive the configuration associated with a layer to reference signal port mapping. In some cases, the UE 115-c may further receive a second configuration associated with a first set of reference signal ports and a second set of reference signal ports.

At 420, the UE 115-c may use the received configuration to identify that at least one layer of a set of layers for receiving a downlink transmission from the base station is adapted based on at least one interference layer. In some cases, the adapted layer may be mapped to one or more reference signal ports.

At 425, the UE 115-c may use the second configuration to identify that the at least one layer is mapped to at least one reference signal port of the first set of reference signal ports. The UE 115-c may further identify that an adaptation of the at least one layer is associated with at least one reference signal port of the second set of reference signal ports.

At 430, the UE 115-c may receive a downlink transmission from the base station 105-c. Upon receiving the downlink transmission, at 435, the UE 115-*c* may decode the downlink transmission based on identifying that the at least one layer is adapted and the layer to reference signal port mapping.

Figure 5:
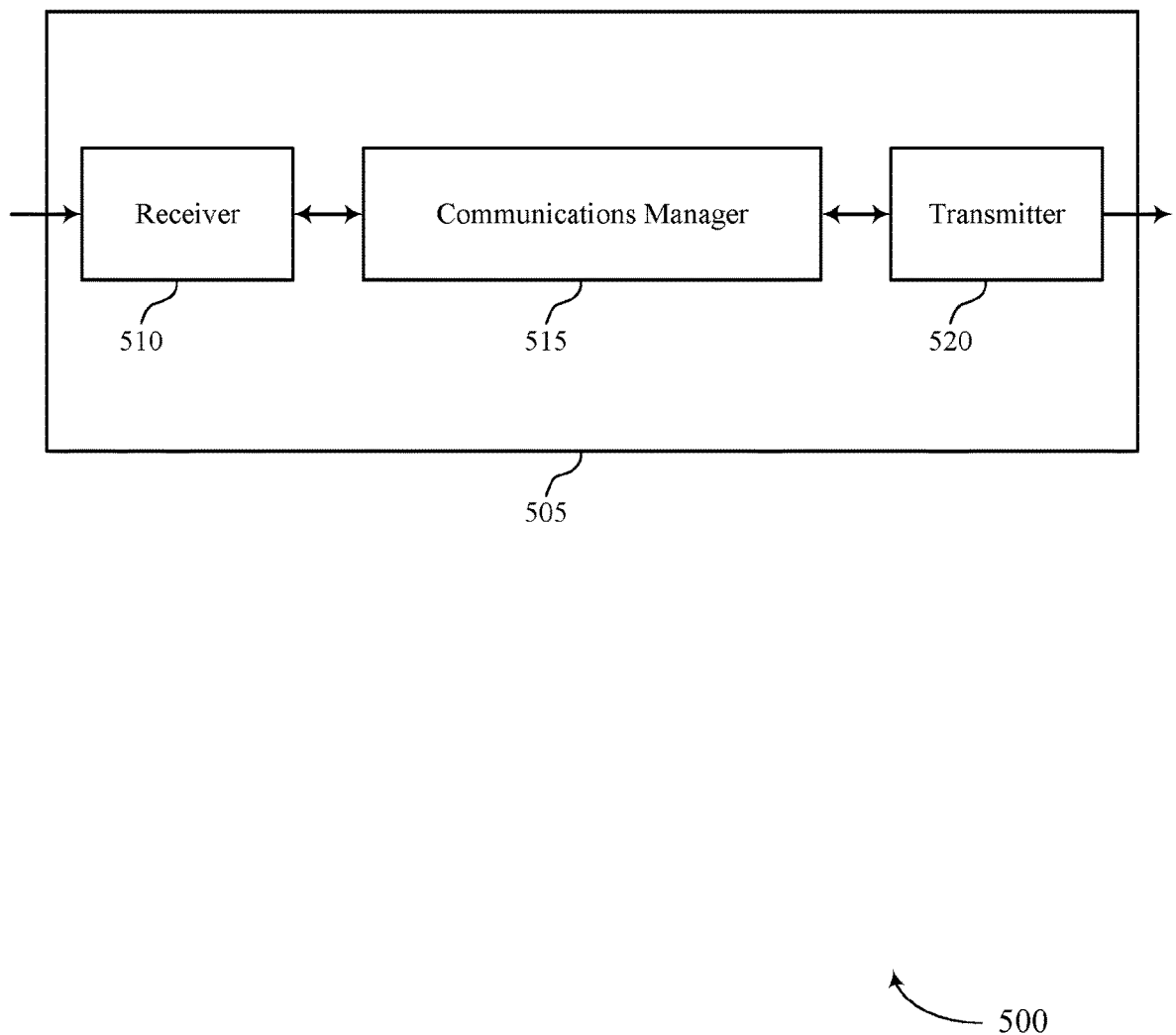
FIGS. 5 and 6 show block diagrams of devices that support signaling design for non-linear precoding schemes in accordance with aspects of the present disclosure.

FIG. 5 shows a block diagram 500 of a device 505 that supports signaling design for non-linear precoding schemes in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling design for non-linear precoding schemes). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a configuration associated with a layer to reference signal port mapping, identify, based on the configuration, that at least one layer of a set of layers for receiving a downlink transmission from the base station is adapted based on at least one interference layer, where the adapted layer is mapped to one or more reference signal ports, receive the downlink transmission, and decode the downlink transmission based on identifying that the at least one layer is adapted and the layer to reference signal port mapping. The communications manager 515 may be an example of aspects of the communications manager 915 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
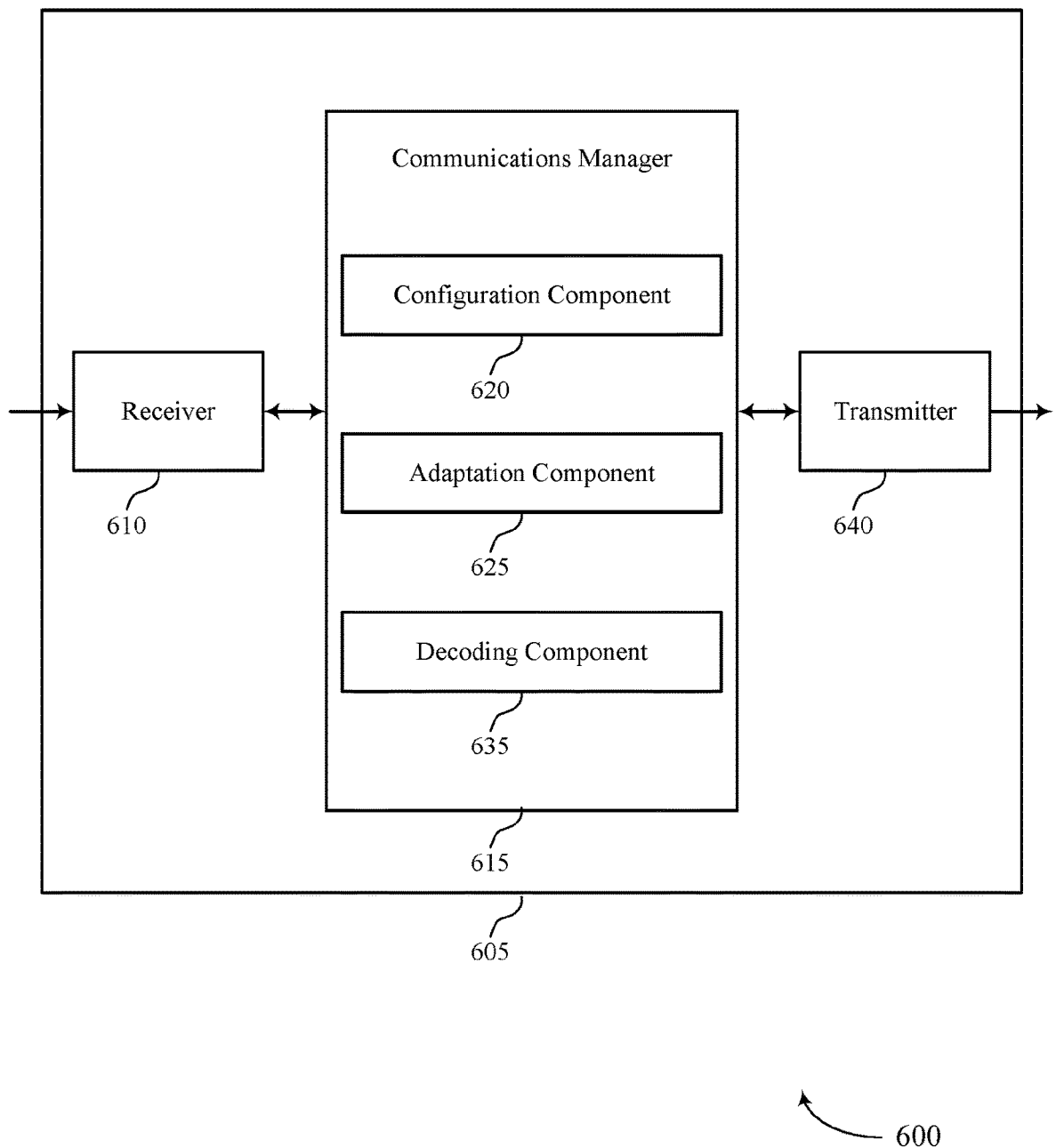

FIG. 6 shows a block diagram 600 of a device 605 that supports signaling design for non-linear precoding schemes in accordance with aspects of the present disclosure. The device 605 may be an example of aspects of a device 505 or a UE 115 as described herein.

The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to signaling design for non-linear precoding schemes). Information may be passed on to other components of the device 605. The receiver 610 may be an example of aspects of the transceiver 820 described with reference to FIG. 8. The receiver 610 may utilize a single antenna or a set of antennas. The receiver 610 may receive the downlink transmission.

The communications manager 615 may be an example of aspects of the communications manager 515 as described herein. The communications manager 615 may include a configuration component 620, an adaptation component 625, and a decoding component 635. The communications manager 615 may be an example of aspects of the communications manager 915 described herein.

The configuration component 620 may receive, from a base station, a configuration associated with a layer to reference signal port mapping.

The adaptation component 625 may identify, based on the configuration, that at least one layer of a set of layers for receiving a downlink transmission from the base station is adapted based on at least one interference layer, where the adapted layer is mapped to one or more reference signal ports.

The decoding component 635 may decode the downlink transmission based on identifying that the at least one layer is adapted and the layer to reference signal port mapping.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
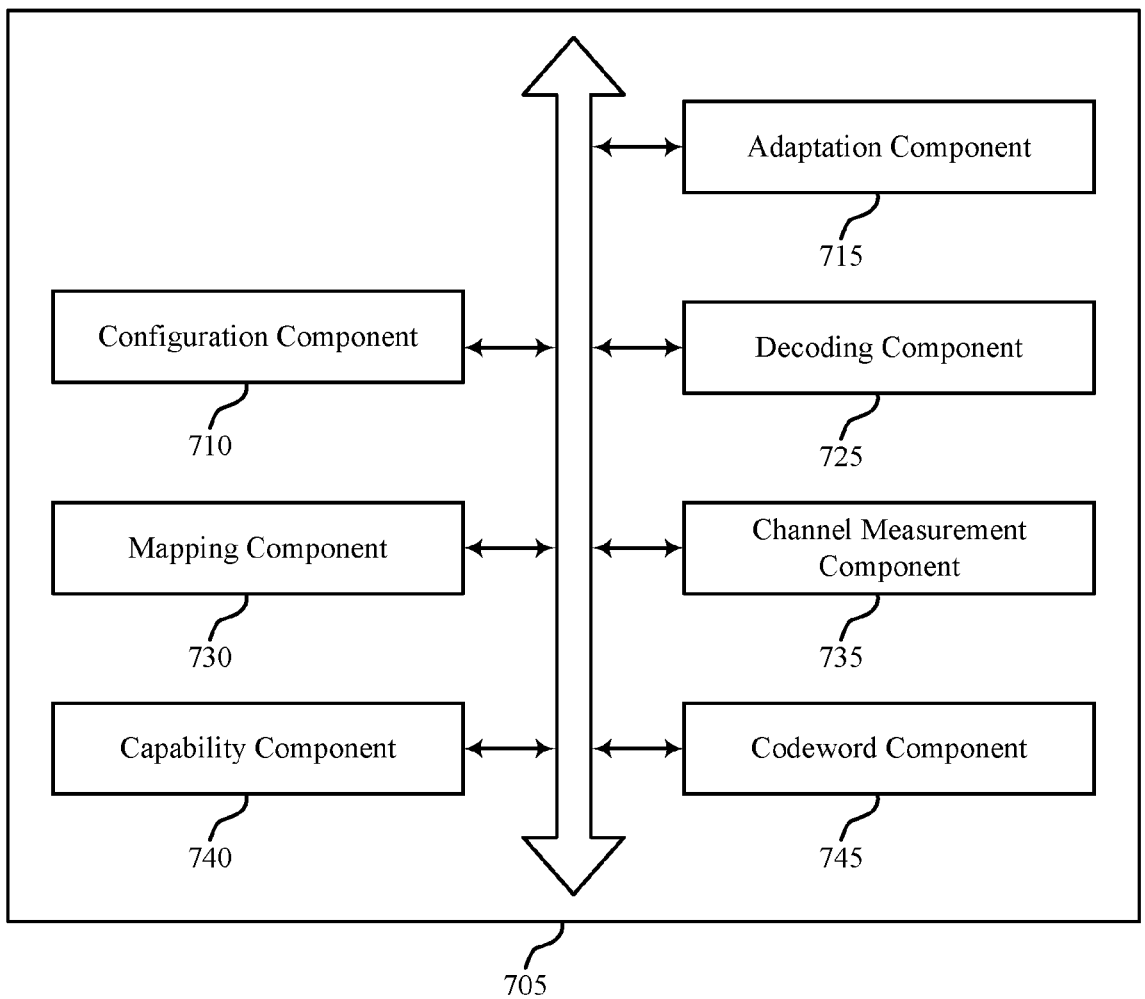
FIG. 7 shows a block diagram of a communications manager that supports signaling design for non-linear precoding schemes in accordance with aspects of the present disclosure.

FIG. 7 shows a block diagram 700 of a communications manager 705 that supports signaling design for non-linear precoding schemes in accordance with aspects of the present disclosure. The communications manager 705 may be an example of aspects of a communications manager 515, a communications manager 615, or a communications manager 915 described herein. The communications manager 705 may include a configuration component 710, an adaptation component 715, a decoding component 725, a mapping component 730, a channel measurement component 735, a capability component 740, and a codeword component 745. Each of these modules may communicate, directly or indirectly, with one another (e.g., via one or more buses).

The configuration component 710 may receive, from a base station, a configuration associated with a layer to reference signal port mapping. In some cases, a configuration associated with the second set of reference signal ports is based on at least one of a precoder granularity, a density, a CDM type, or any combination thereof, and where the configuration associated with the second set of reference signal ports is different from a configuration associated with the first set of reference signal ports. In some examples, the configuration component 710 may receive, from the base station, a second configuration associated with a first set of reference signal ports and a second set of reference signal ports.

In some examples, the configuration component 710 may receive, from the base station, a third configuration identifying a relationship between ports of the first set of reference signal ports and ports of the second set of reference signal ports, where determining the adaptation of the at least one layer associated with the at least one reference signal port of the second set of reference signal ports is based on the third configuration. In some examples, the first set of reference signal ports and the second set of reference signal ports may have a same configuration. In some cases, the configuration component 710 may receive a set of candidate relationships using a higher layer signaling and may receive a set of bits in a downlink control indicator indicating a use of a candidate relationship from the set of candidate relationships.

In some examples, the configuration component 710 may receive, from the base station, a second configuration to identify the at least one interference layer associated with the at least one layer, where an adaptation is based on the at least one interference layer. In some examples, the configuration component 710 may receive, from the base station, the configuration via one or more fields of a downlink control indicator, or receiving, from the base station, the configuration in a downlink control indicator format, where the configuration is based on the capability information.

In some cases, the first set of reference signal ports and the second set of reference signal ports include demodulation reference signal ports. In some cases, the second set of reference signal ports includes a dedicated channel used for determining an adaptation.

The adaptation component 715 may identify, based on the configuration, that at least one layer of a set of layers for receiving a downlink transmission from the base station is adapted based on at least one interference layer, where the adapted layer is mapped to one or more reference signal ports.

In some examples, the adaptation component 715 may identify a relationship between ports of the first set of reference signal ports and ports of the second set of reference signal ports and may determine the adaptation of the at least one layer associated with the at least one reference signal port of the second set of reference signal ports based on the relationship. In some cases, identifying the relationship is based at least in part on a preconfigured rule. In some cases, identifying the relationship between the ports of the first set of reference signal ports and the ports of the second set of reference signal ports may be based on one or more indices of the ports of the first set of reference signal ports and the ports of the second set of reference signal port.

In some examples, the adaptation component 715 may determine the adaptation of the at least one layer associated with the at least one reference signal port of the second set of reference signal ports based on information mapped to the first set of reference signal ports and information mapped to the reference signal port of the second set of reference signal ports. In some cases, the at least one layer is adapted by subtracting a product of the at least one interference layer and at least one perturbation factor, and where determining an adaptation further includes determining the at least one perturbation factor. In some cases, a signal resulting from subtracting the product of the at least one interference layer and at least one perturbation factor is modified using a non-linear operator. In some cases, the non-linear operator includes a modulo operator. In some cases, the set of layers includes an adapted layer and a non-adapted layer. In some cases, a receiver (not shown) may receive the downlink transmission.

In some examples, the adaptation component 715 may receive an indication identifying one or more candidate combinations of any two of the configurations of layer to port mapping, the second configuration associated with the first set of reference signal ports and the second set of reference signal ports, the third configuration identifying the relationship of the first set of reference signal ports and the second set of reference signal ports, the second configuration associated with the identification of the at least one interference layers, and the third configuration associated with the relationship between the at least one interference layers and the ports of the second set of reference signal ports. In some cases, the adaptation component 715 may determine the adaptation of the at least one layer based on the indication identifying one or more candidate combinations of any two of the configurations of layer to port mapping.

In some examples, the adaptation component 715 may identify at least two candidate combinations based at least in part on the indication, receive a second indication identifying a selected candidate combination of configurations, and determine the adaptation of the at least one layer based on the second indication.

In some examples, the adaptation component 715 may receive the indication and the second indication via an RRC, a medium access control layer control element, a downlink control indicator, or a combination thereof.

The decoding component 725 may decode the downlink transmission based on identifying that the at least one layer is adapted and the layer to reference signal port mapping.

The mapping component 730 may identify, based on the second configuration, that the at least one layer is mapped to at least one reference signal port of the first set of reference signal ports, and that an adaptation of the at least one layer is associated with at least one reference signal port of the second set of reference signal ports.

The channel measurement component 735 may determine a measurement of a channel associated with the downlink transmission based on information mapped to the first set of reference signal ports, where determining the adaptation associated with the at least one reference signal port of the second set of reference signal ports is based on the measurement of the channel.

The capability component 740 may transmit, to the base station, capability information associated with the at least one layer, where the configuration is based on the capability information. In some cases, the capability information includes a capability to support a number of adapted layers, a capability to support a number of interference layers associated with a number of adapted layers, or both.

The codeword component 745 may determine a codeword associated with the adapted layer and the non-adapted layer. In some cases, the adapted layer and the non-adapted layer are associated with a same codeword. In some cases, the adapted layer and the non-adapted layer are associated with different codewords.

Figure 8:
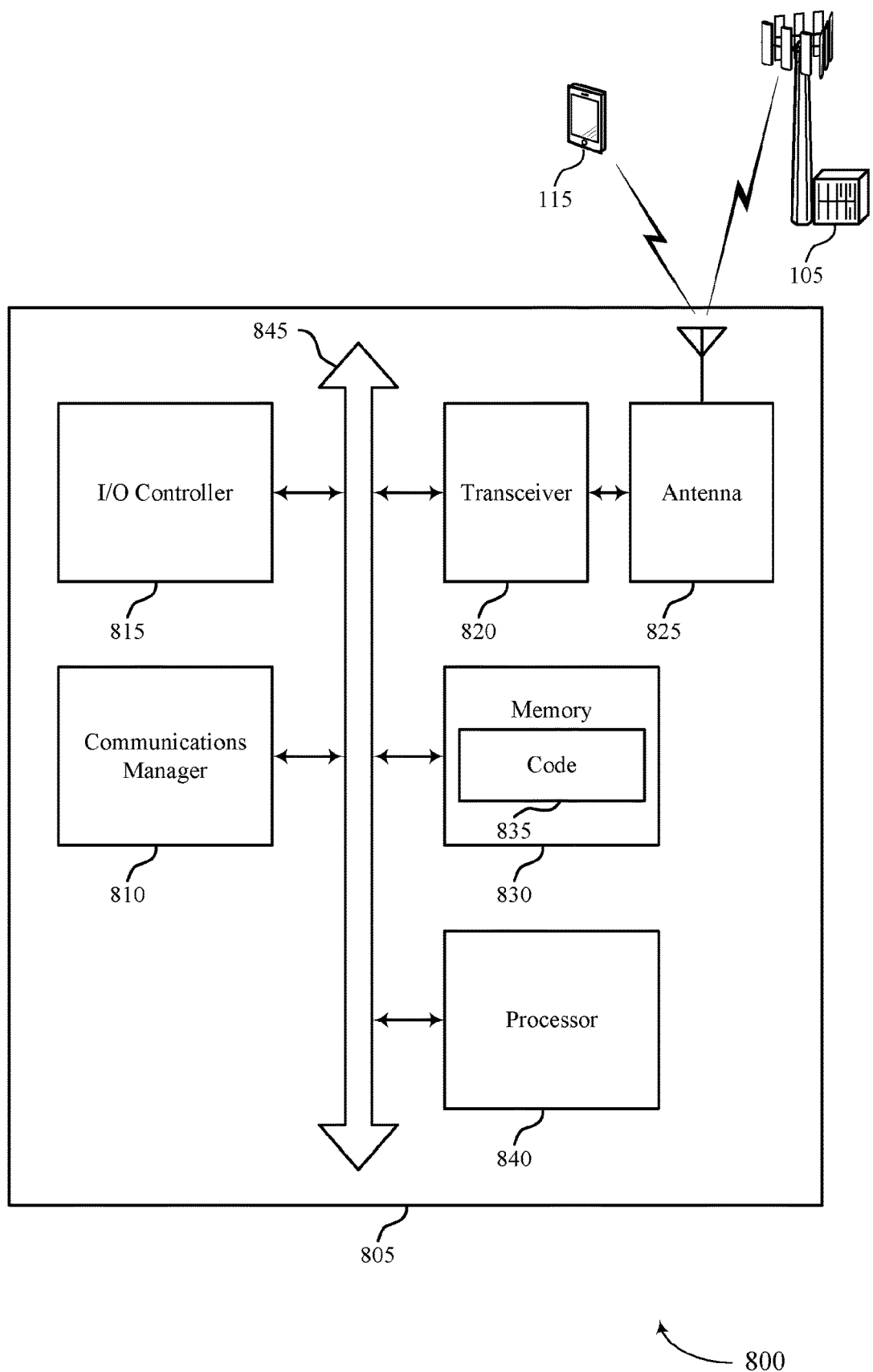
FIG. 8 shows a diagram of a system including a device that supports signaling design for non-linear precoding schemes in accordance with aspects of the present disclosure.

FIG. 8 shows a diagram of a system 800 including a device 805 that supports signaling design for non-linear precoding schemes in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a configuration associated with a layer to reference signal port mapping, identify, based on the configuration, that at least one layer of a set of layers for receiving a downlink transmission from the base station is adapted based on at least one interference layer, where the adapted layer is mapped to one or more reference signal ports, receive the downlink transmission, and decode the downlink transmission based on identifying that the at least one layer is adapted and the layer to reference signal port mapping.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/basic output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling design for non-linear precoding schemes).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
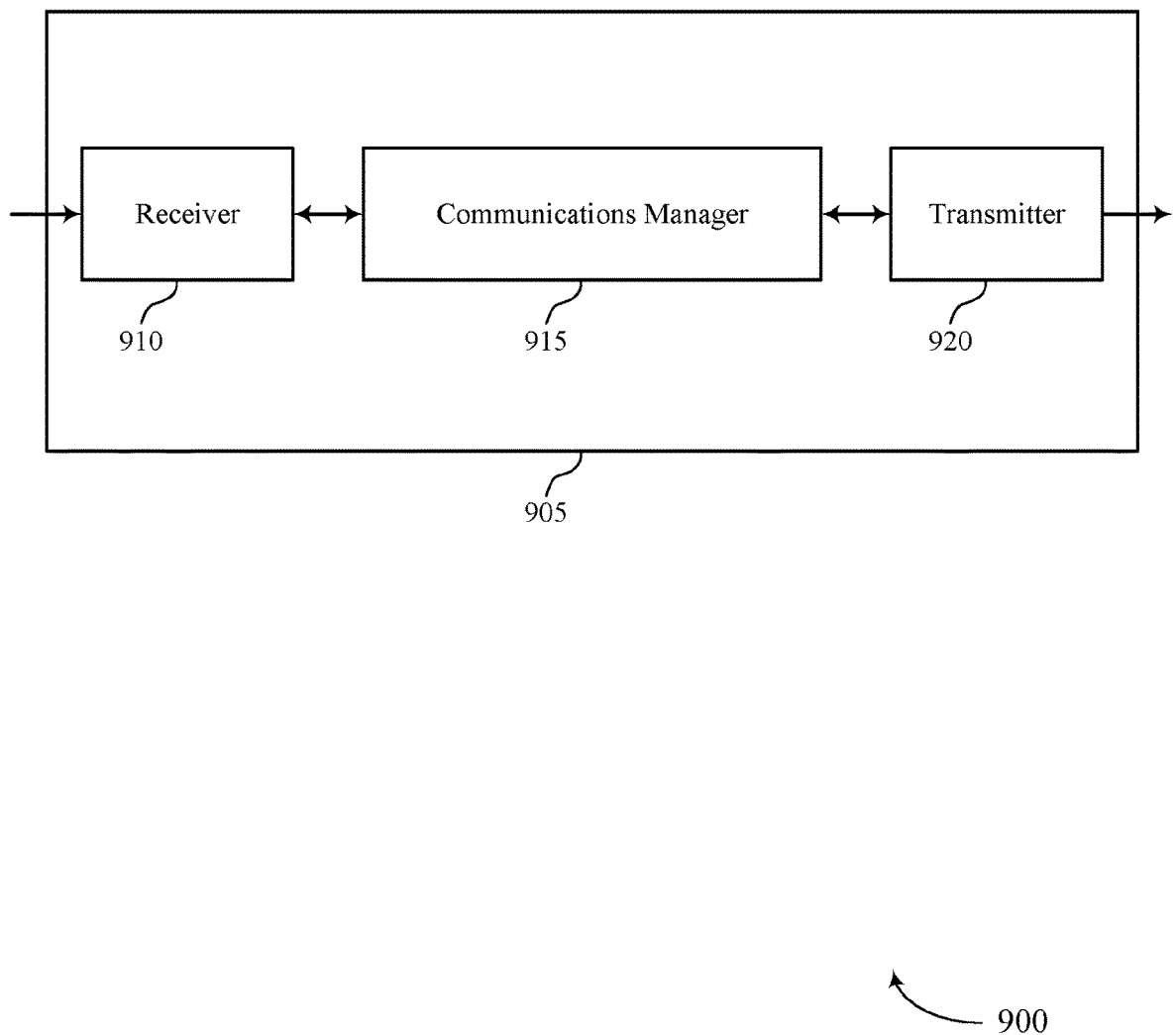
FIGS. 9 and 10 show block diagrams of devices that support signaling design for non-linear precoding schemes in accordance with aspects of the present disclosure.

FIG. 9 shows a block diagram 900 of a device 905 that supports signaling design for non-linear precoding schemes in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling design for non-linear precoding schemes). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine that at least one layer of a set of layers of a downlink transmission is adapted based on at least one interference layer, and that the at least one adapted layer is mapped to a reference signal port, transmit, to a UE, a configuration associated with a layer to reference signal port mapping based on the determining, and transmit the downlink transmission to the UE based on the configuration. The communications manager 915 may be an example of aspects of the communications manager 1310 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
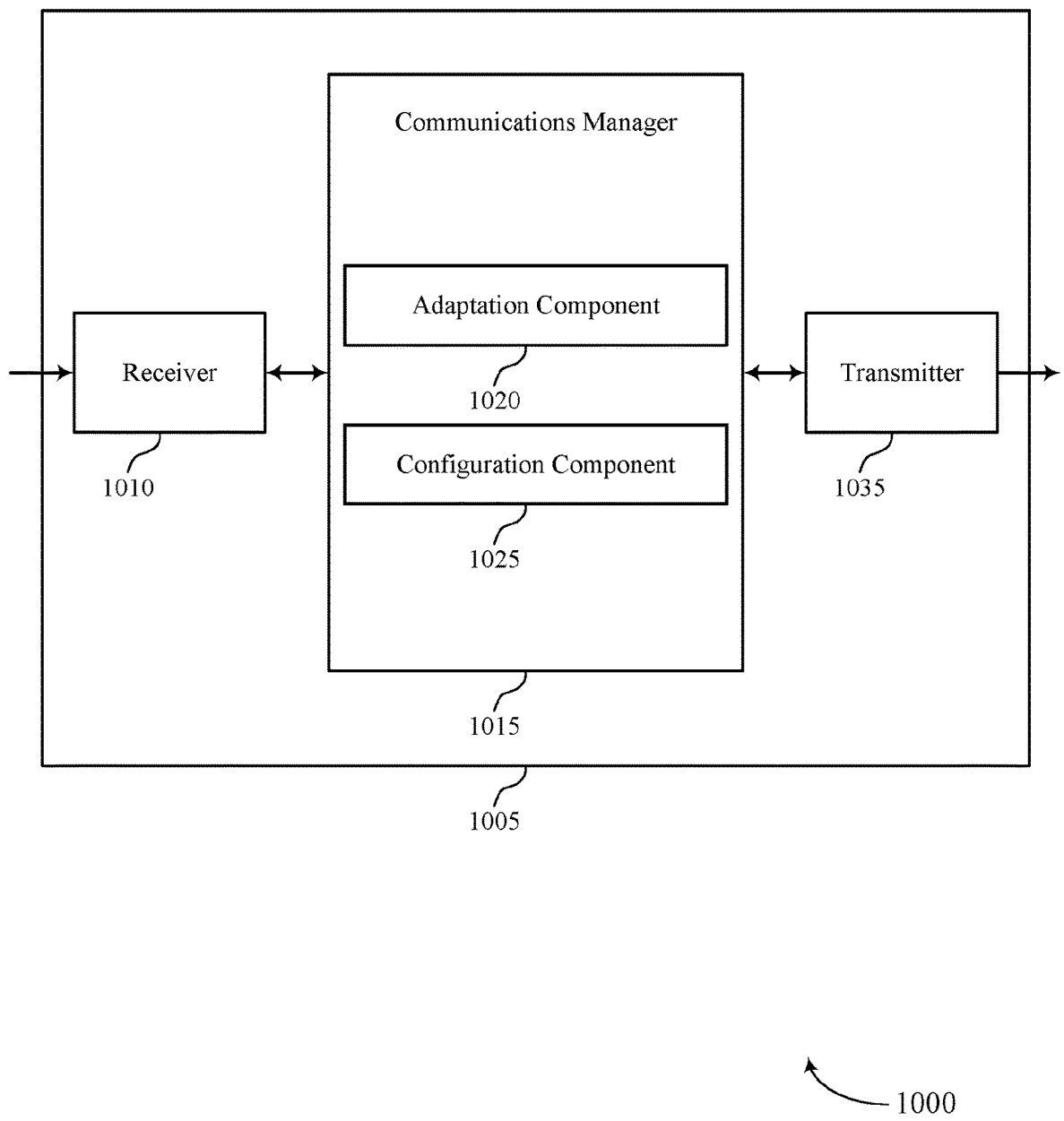

FIG. 10 shows a block diagram 1000 of a device 1005 that supports signaling design for non-linear precoding schemes in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling design for non-linear precoding schemes). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an adaptation component 1020, and a configuration component 1025. The communications manager 1015 may be an example of aspects of the communications manager 1310 described herein.

The adaptation component 1020 may determine that at least one layer of a set of layers of a downlink transmission is adapted based on at least one interference layer, and that the at least one adapted layer is mapped to a reference signal port.

The configuration component 1025 may transmit, to a UE, a configuration associated with a layer to reference signal port mapping based on the determining.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas. The transmitter 1035 may transmit the downlink transmission to the UE based on the configuration.

Figure 11:
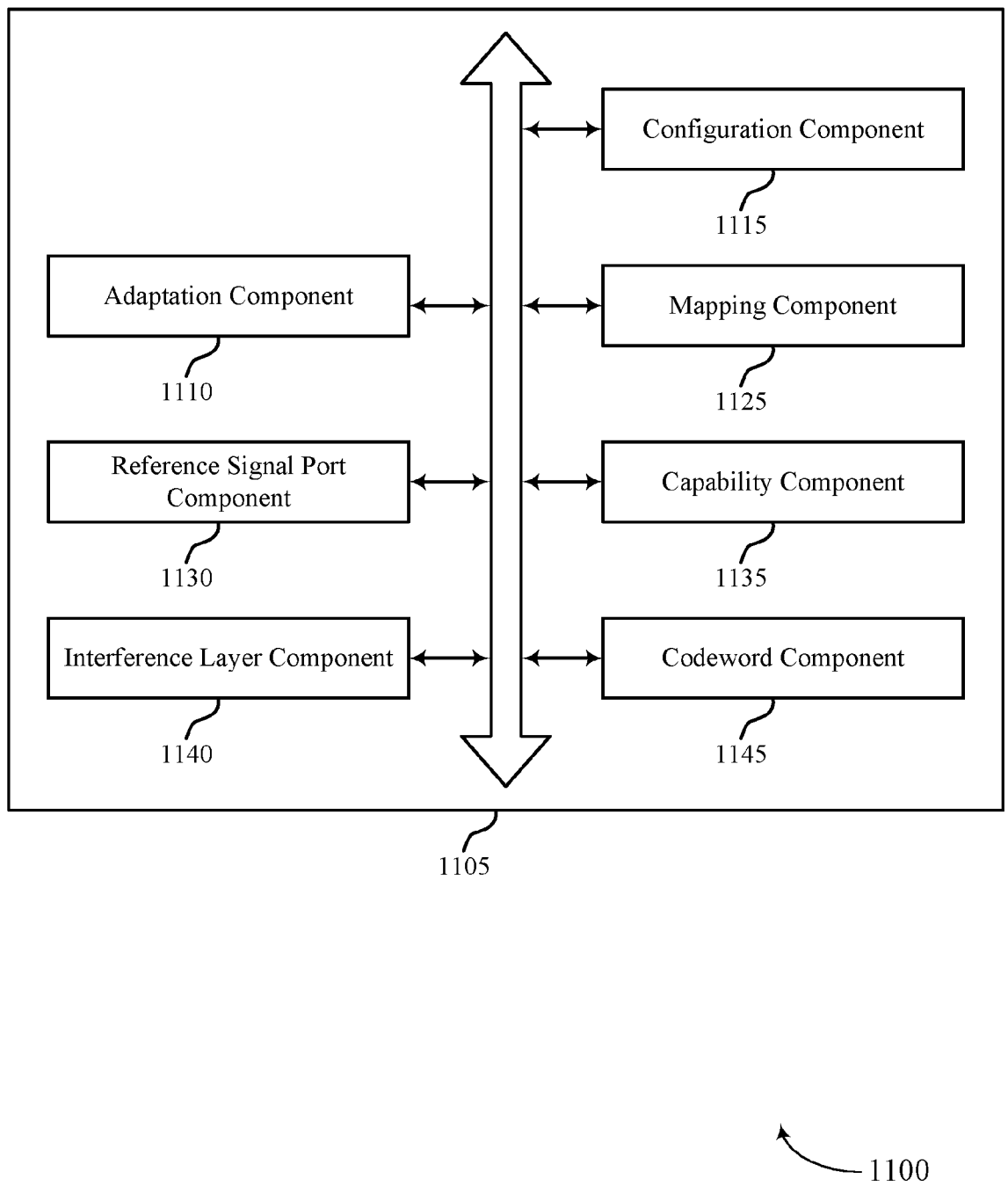
FIG. 11 shows a block diagram of a communications manager that supports signaling design for non-linear precoding schemes in accordance with aspects of the present disclosure.

FIG. 11 shows a block diagram 1100 of a communications manager 1105 that supports signaling design for non-linear precoding schemes in accordance with aspects of the present disclosure. The communications manager 1105 may be an example of aspects of a communications manager 915, a communications manager 1015, or a communications manager 1310 described herein. The communications manager 1105 may include an adaptation component 1110, a configuration component 1115, a mapping component 1125, a reference signal port component 1130, a capability component 1135, an interference layer component 1140, and a codeword component 1145. Each of these modules may communicate, directly or indirectly, with one another (e.g., via one or more buses).

The adaptation component 1110 may determine that at least one layer of a set of layers of a downlink transmission is adapted based on at least one interference layer, and that the at least one adapted layer is mapped to a reference signal port. In some cases, the adaptation component 1110 may determine a relationship between ports of the first set of reference signal ports and ports of the second set of reference signal ports. In some cases, the adaptation component 1110 may determine the adaptation of the at least one layer associated with the at least one reference signal port of the second set of reference signal ports based on the relationship.

In some cases, the adaptation component 1110 may determine one or more indices of the ports of the first set of reference signal ports and the ports of the second set of reference signal ports. In some cases, the relationship between the ports of the first set of reference signal ports and the ports of the second set of reference signal ports is based on one or more indices of the ports of the first set of reference signal ports and the ports of the second set of reference signal ports.

In some cases, the at least one layer is adapted by subtracting a product of the at least one interference layer and at least one perturbation factor, where determining the adaptation further includes determining the at least one perturbation factor. In some cases, a signal resulting from subtracting the product of the at least one interference layer and at least one perturbation factor is modified using a non-linear operator. In some cases, the non-linear operator includes a modulo operator. In some cases, the set of layers include an adapted layer and a non-adapted layer.

The configuration component 1115 may transmit, to a UE, a configuration associated with a layer to reference signal port mapping based on the determining. In some examples, the configuration component 1115 may transmit a second configuration associated with the at least one precoding layer and a relationship between the first set of reference signal ports and the second set of reference signal ports. In some examples, the configuration component 1115 may determine the configuration based on the capability information.

In some cases, the configuration component 1115 may transmit, to z UE, a third configuration identifying the relationship between the ports of the first set of reference signal ports and the ports of the second set of reference signal ports. In some cases, determining the adaptation of the at least one layer associated with the at least one reference signal port of the second set of reference signal ports is based on the third configuration. In some cases, the configuration component 1115 may transmit a set of candidate relationships using a higher layer signaling and may transmit a set of bits in a downlink control indicator indicating a use of a candidate relationship from the set of candidate relationships.

In some cases, the configuration component 1115 may a configuration associated with the second set of reference signal ports, where the configuration includes at least one of a precoder granularity, a density of the ports, a frequency occupancy, a time occupancy, a CDM type, or any combination thereof. In some cases, the configuration component 1115 may transmit a second configuration to identify the at least one interference layer associated with the at least one layer, where an adaptation is based at least in part on the at least one interference layer. In some cases, the configuration component 1115 may transmit a third configuration to identify the relationship between the at least one interference layer and ports of the second set of reference signal ports, where the relationship between the ports of the first set of reference signal ports and the ports of the second set of reference signal ports is based at least in part on one or more indices of the ports of the first set of reference signal ports and the ports of the second set of reference signal ports.

In some cases, the configuration component 1115 may transmit an indication identifying one or more candidate combinations of any two of the configurations of layer to port mapping, the second configuration associated with the first set of reference signal ports and the second set of reference signal ports, the third configuration identifying the relationship of the first set of reference signal ports and the second set of reference signal ports, the second configuration associated with the identification of the at least one interference layers, and the third configuration associated with the relationship between the at least one interference layers and the ports of the second set of reference signal ports. In some cases, determining the adaptation of the at least one layer is based on the indication identifying one or more candidate combinations of any two of the configurations of layer to port mapping.

In some cases, the configuration component 1115 may transmit a second indication identifying a selected candidate combination of configurations. In some implementations, determining the adaptation of the at least one layer is based on the second indication. In some cases, the configuration component 1115 may transmit the indication and the second indication via an RRC, a medium access control layer control element, a downlink control indicator, or a combination thereof.

In some examples, the configuration component 1115 may transmit the configuration via one or more fields of downlink control indicator, or via a downlink control indicator format. A transmitter (not shown) may transmit the downlink transmission to the UE based on the configuration.

The mapping component 1125 may determine a first set of reference signal ports and a second set of reference signal ports, where the at least one adapted layer is mapped to at least one reference signal port of the first set of reference signal ports, and an adaptation is associated with at least one reference signal port of the second set of reference signal ports.

The reference signal port component 1130 may transmit the first set of reference signal ports and the second set of reference signal ports to the UE. In some cases, the first set of reference signal ports and the second set of reference signal ports are demodulation reference signal ports. In some cases, a configuration associated with the second set of reference signal ports is based on at least one of a precoder granularity, a density of the ports, a frequency occupancy, a time occupancy, a CDM type, or any combination thereof, where the configuration associated with the second set of reference signal ports is different from a configuration associated with the first set of reference signal ports. In some cases, the first set of reference signal ports and the second set of reference signal ports have a same configuration. In some cases, the second set of reference signal ports includes a channel for determining the adaptation.

The capability component 1135 may receive, from the UE, capability information including a capability to support a number of adapted layers, a capability to support a number of interference layers associated with a number of adapted layers, or both. The interference layer component 1140 may identify at least one interference layer associated with the at least one adapted layer of the UE. In some examples, identifying a relationship between the adaptation and the at least one interference layer and may identify a relationship between the adaptation and the at least one interference layer. In some cases, transmitting the configuration includes transmitting the configuration indicating the relationship between the adaptation and the at least one interference layer.

The codeword component 1145 may determine one or more codewords associated with the adapted layer and the non-adapted layer. In some cases, the adapted layer and the non-adapted layer are associated with a same codeword. In some cases, the adapted layer and the non-adapted layer are associated with different codewords.

Figure 12:
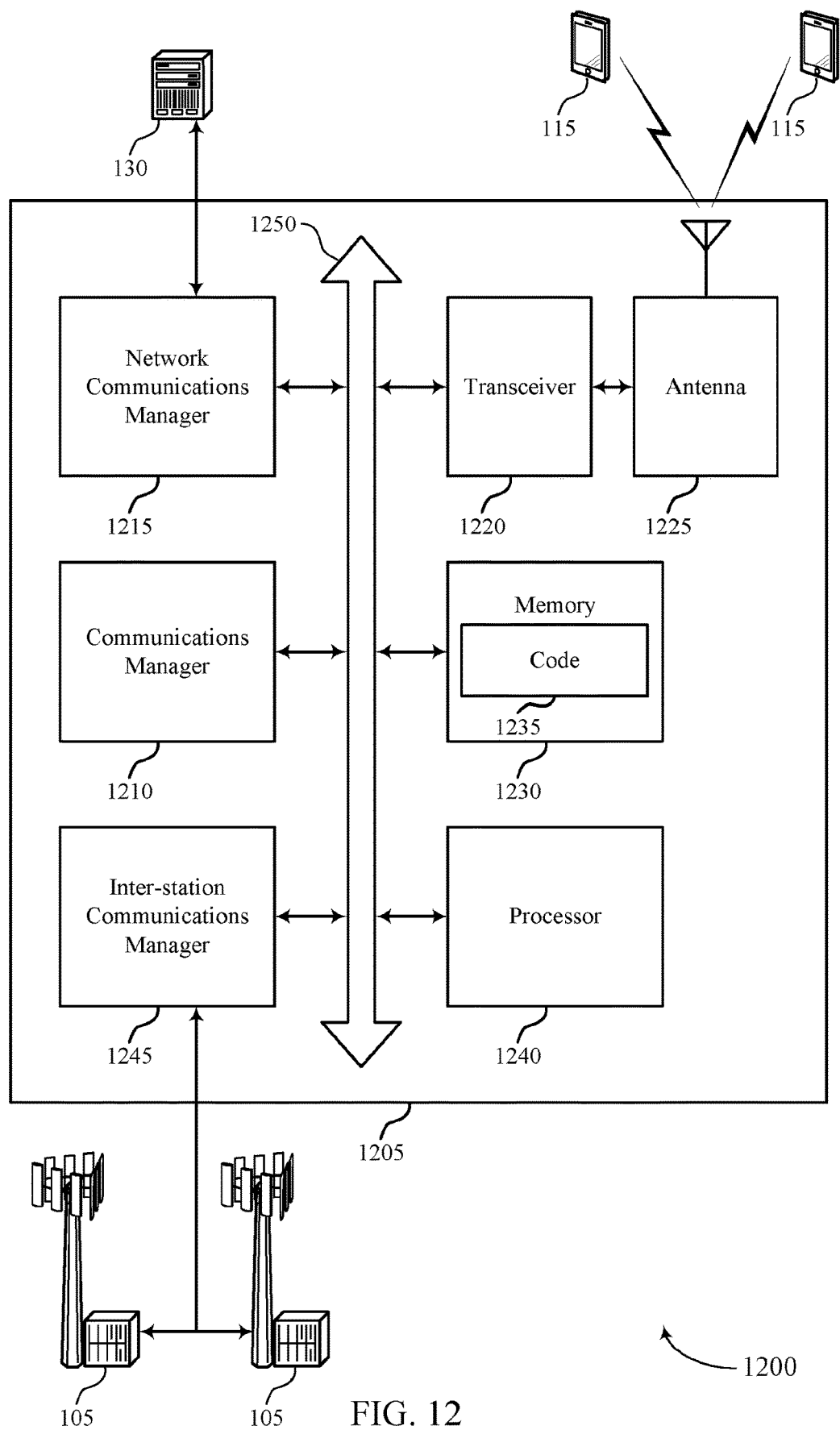
FIG. 12 shows a diagram of a system including a device that supports signaling design for non-linear precoding schemes in accordance with aspects of the present disclosure.

FIG. 12 shows a diagram of a system 1200 including a device 1205 that supports signaling design for non-linear precoding schemes in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine that at least one layer of a set of layers of a downlink transmission is adapted based on at least one interference layer, and that the at least one adapted layer is mapped to a reference signal port, transmit, to a UE, a configuration associated with a layer to reference signal port mapping based on the determining, and transmit the downlink transmission to the UE based on the configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting signaling design for non-linear precoding schemes).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
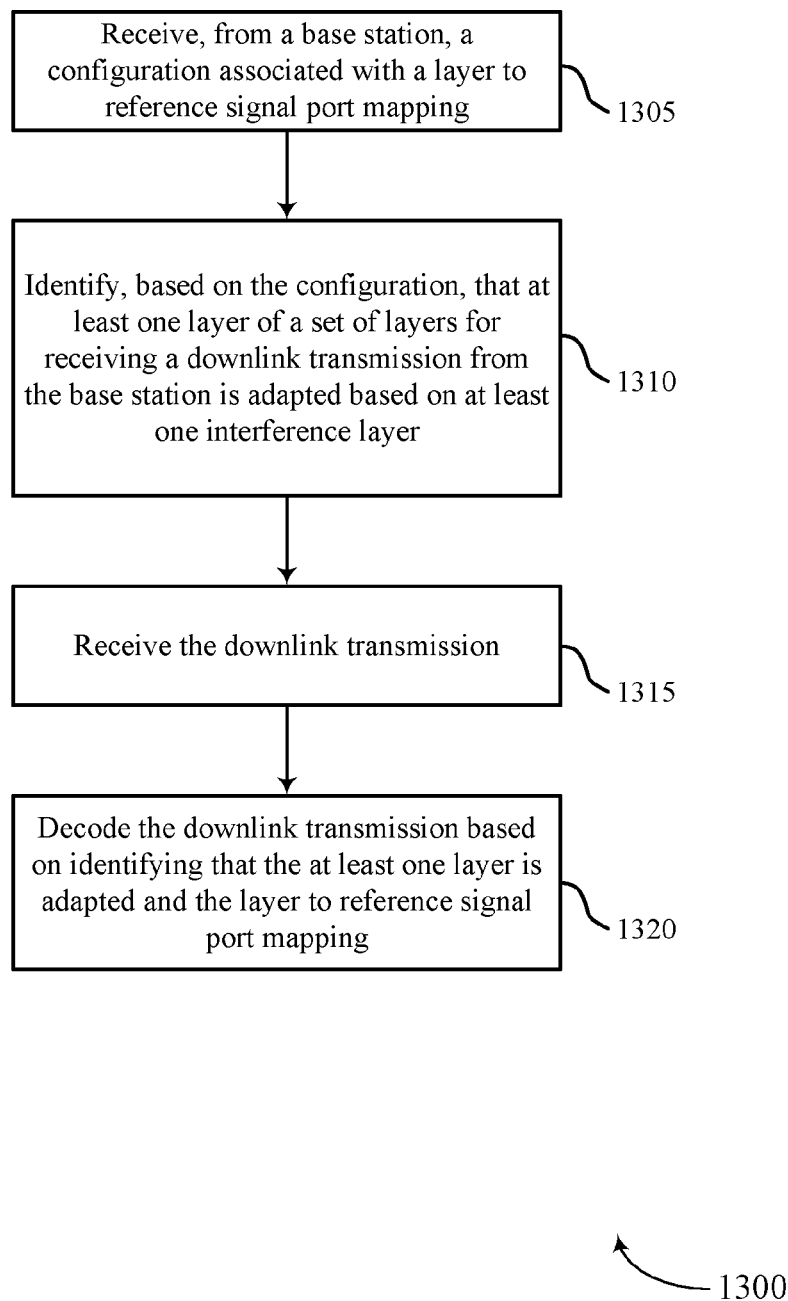
FIGS. 13 through 16 show flowcharts illustrating methods that support signaling design for non-linear precoding schemes in accordance with aspects of the present disclosure.

FIG. 13 shows a flowchart illustrating a method 1300 that supports signaling design for non-linear precoding schemes in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a configuration associated with a layer to reference signal port mapping. The operations of 1305 may be performed according to the methods described herein. In some examples, aspects of the operations of 1305 may be performed by a configuration component as described with reference to FIGS. 5 through 8.

At 1310, the UE may identify, based on the configuration, that at least one layer of a set of layers for receiving a downlink transmission from the base station is adapted based on at least one interference layer. In some cases, the adapted layer is mapped to one or more reference signal ports. The operations of 1310 may be performed according to the methods described herein. In some examples, aspects of the operations of 1310 may be performed by an adaptation component as described with reference to FIGS. 5 through 8.

At 1315, the UE may receive the downlink transmission. The operations of 1315 may be performed according to the methods described herein. In some examples, aspects of the operations of 1315 may be performed by a receiver as described with reference to FIGS. 5 through 8.

At 1320, the UE may decode the downlink transmission based on identifying that the at least one layer is adapted and the layer to reference signal port mapping. The operations of 1320 may be performed according to the methods described herein. In some examples, aspects of the operations of 1320 may be performed by a decoding component as described with reference to FIGS. 5 through 8.

Figure 14:
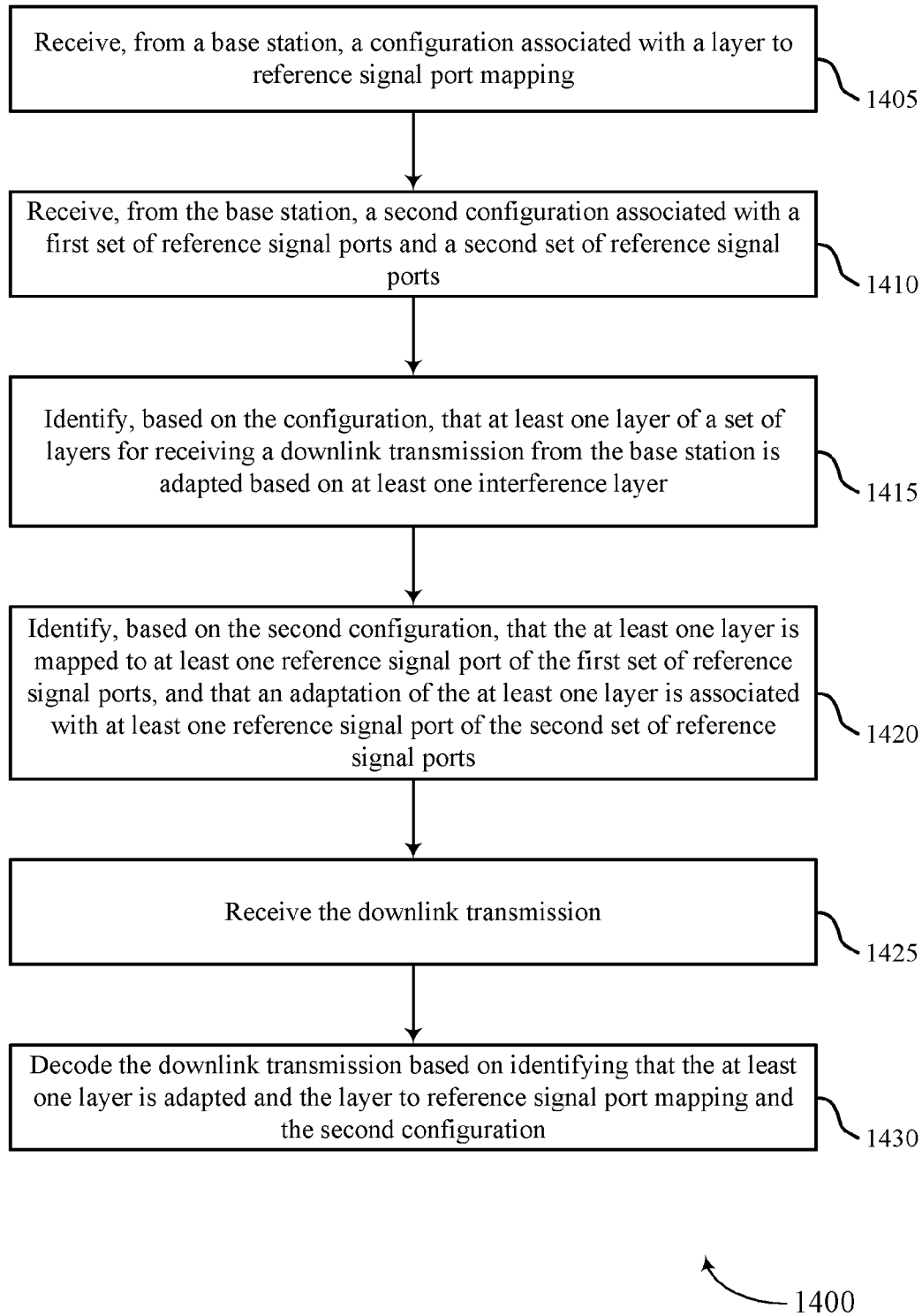

FIG. 14 shows a flowchart illustrating a method 1400 that supports signaling design for non-linear precoding schemes in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration associated with a layer to reference signal port mapping. The operations of 1405 may be performed according to the methods described herein. In some examples, aspects of the operations of 1405 may be performed by a configuration component as described with reference to FIGS. 5 through 8.

At 1410, the UE may receive, from the base station, a second configuration associated with a first set of reference signal ports and a second set of reference signal ports. The operations of 1410 may be performed according to the methods described herein. In some examples, aspects of the operations of 1410 may be performed by a configuration component as described with reference to FIGS. 5 through 8.

At 1415, the UE may identify, based on the configuration, that at least one layer of a set of layers for receiving a downlink transmission from the base station is adapted based on at least one interference layer, where the adapted layer is mapped to one or more reference signal ports. The operations of 1415 may be performed according to the methods described herein. In some examples, aspects of the operations of 1415 may be performed by an adaptation component as described with reference to FIGS. 5 through 8.

At 1420, the UE may identify, based on the second configuration, that the at least one layer is mapped to at least one reference signal port of the first set of reference signal ports, and that an adaptation of the at least one layer is associated with at least one reference signal port of the second set of reference signal ports. The operations of 1420 may be performed according to the methods described herein. In some examples, aspects of the operations of 1420 may be performed by a mapping component as described with reference to FIGS. 5 through 8.

At 1425, the UE may receive the downlink transmission. The operations of 1425 may be performed according to the methods described herein. In some examples, aspects of the operations of 1425 may be performed by a receiver as described with reference to FIGS. 5 through 8.

At 1430, the UE may decode the downlink transmission based on identifying that the at least one layer is adapted and the layer to reference signal port mapping and the second configuration. The operations of 1430 may be performed according to the methods described herein. In some examples, aspects of the operations of 1430 may be performed by a decoding component as described with reference to FIGS. 5 through 8.

Figure 15:
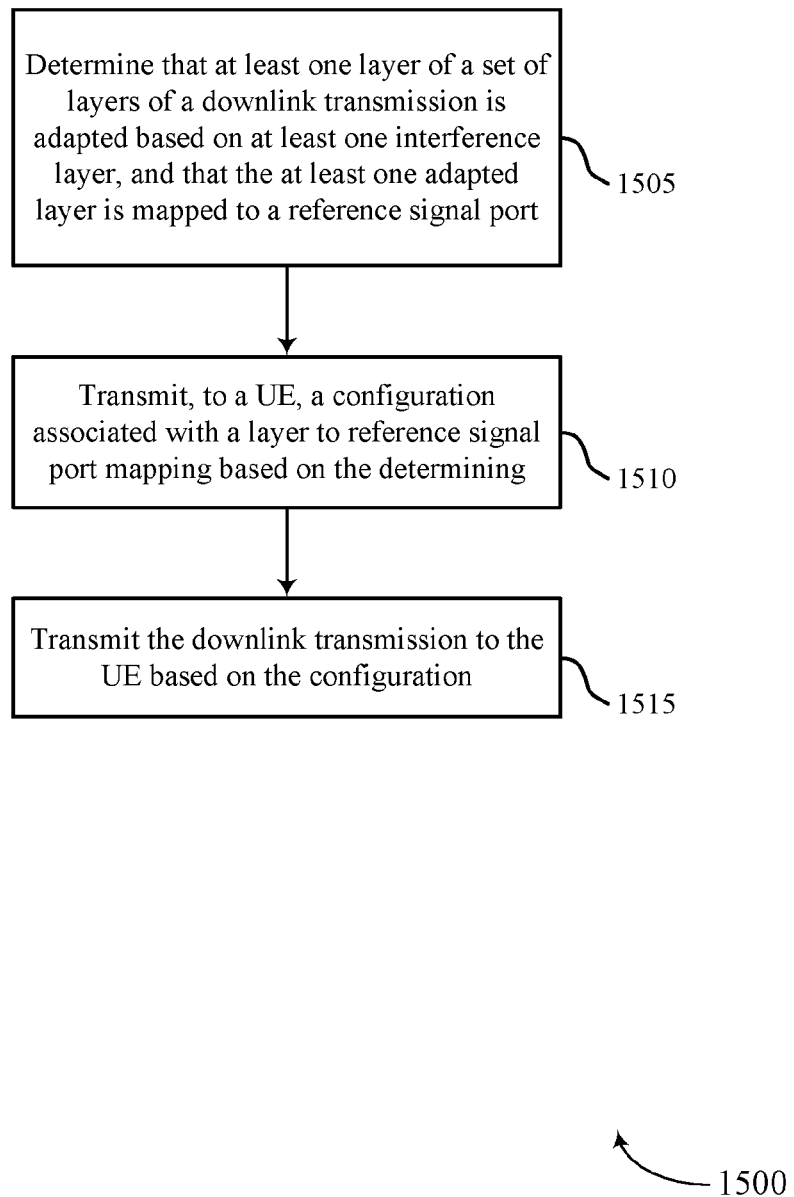

FIG. 15 shows a flowchart illustrating a method 1500 that supports signaling design for non-linear precoding schemes in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may determine that at least one layer of a set of layers of a downlink transmission is adapted based on at least one interference layer, and that the at least one adapted layer is mapped to a reference signal port. The operations of 1505 may be performed according to the methods described herein. In some examples, aspects of the operations of 1505 may be performed by an adaptation component as described with reference to FIGS. 9 through 12.

At 1510, the base station may transmit, to a UE, a configuration associated with a layer to reference signal port mapping based on the determining. The operations of 1510 may be performed according to the methods described herein. In some examples, aspects of the operations of 1510 may be performed by a configuration component as described with reference to FIGS. 9 through 12.

At 1515, the base station may transmit the downlink transmission to the UE based on the configuration. The operations of 1515 may be performed according to the methods described herein. In some examples, aspects of the operations of 1515 may be performed by a transmitter as described with reference to FIGS. 9 through 12.

Figure 16:
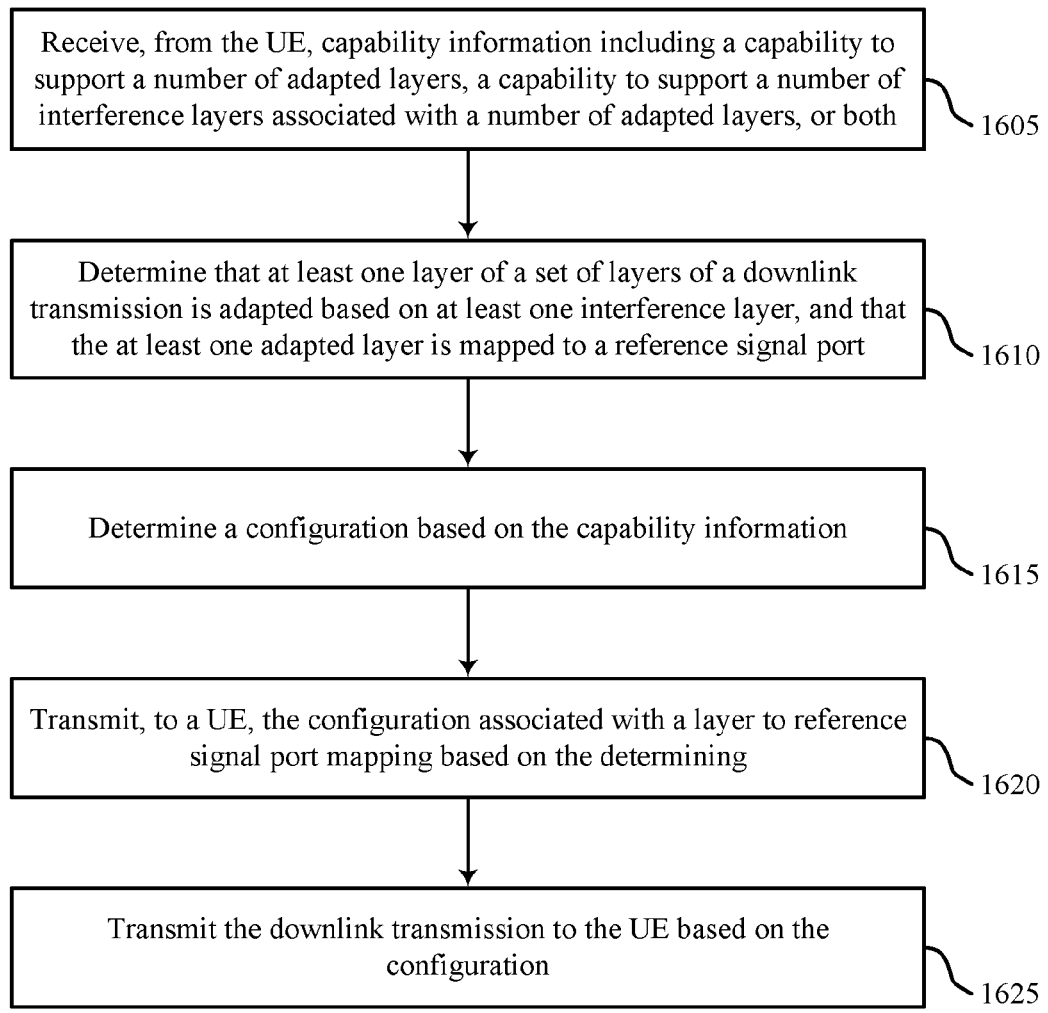

FIG. 16 shows a flowchart illustrating a method 1600 that supports signaling design for non-linear precoding schemes in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from the UE, capability information including a capability to support a number of adapted layers, a capability to support a number of interference layers associated with a number of adapted layers, or both. The operations of 1605 may be performed according to the methods described herein. In some examples, aspects of the operations of 1605 may be performed by a capability component as described with reference to FIGS. 9 through 12.

At 1610, the base station may determine that at least one layer of a set of layers of a downlink transmission is adapted based on at least one interference layer, and that the at least one adapted layer is mapped to a reference signal port. The operations of 1610 may be performed according to the methods described herein. In some examples, aspects of the operations of 1610 may be performed by an adaptation component as described with reference to FIGS. 9 through 12.

At 1615, the base station may determine a configuration based on the capability information. The operations of 1615 may be performed according to the methods described herein. In some examples, aspects of the operations of 1615 may be performed by a configuration component as described with reference to FIGS. 9 through 12.

At 1620, the base station may transmit, to a UE, the configuration associated with a layer to reference signal port mapping based on the determining. The operations of 1620 may be performed according to the methods described herein. In some examples, aspects of the operations of 1620 may be performed by a configuration component as described with reference to FIGS. 9 through 12.

At 1625, the base station may transmit the downlink transmission to the UE based on the configuration. The operations of 1625 may be performed according to the methods described herein. In some examples, aspects of the operations of 1625 may be performed by a transmitter as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a memory; and
at least one processor coupled to the memory, wherein the at least one processor is configured to:
receive, from a network device, a configuration associated with a layer to reference signal port mapping;
identify, based on the configuration, that at least one layer of a set of layers used to receive a downlink transmission from the network device is adapted based on at least one interference layer, wherein the at least one adapted layer is mapped to one or more reference signal ports;
receive the downlink transmission; and
decode the downlink transmission based on the identification that the at least one layer is adapted and the layer to reference signal port mapping.

2. The apparatus of claim 1, wherein the at least one processor is further configured to:
receive, from the network device, a second configuration associated with a first set of reference signal ports and a second set of reference signal ports;
identify, based on the second configuration, that the at least one layer is mapped to at least one reference signal port of the first set of reference signal ports, and that an adaptation of the at least one layer is associated with at least one reference signal port of the second set of reference signal ports; and
receive the first set of reference signal ports and the second set of reference signal ports.

3. The apparatus of claim 2, wherein the at least one processor is further configured to:
identify, a relationship between ports of the first set of reference signal ports and ports of the second set of reference signal ports; and
determine the adaptation of the at least one layer associated with the at least one reference signal port of the second set of reference signal ports based on the relationship.

4. The apparatus of claim 3, wherein
the identification of the relationship is based on a rule.

5. The apparatus of claim 4 wherein to identify the relationship, the at least one processor is configured to:
identify the relationship between the ports of the first set of reference signal ports and the ports of the second set of reference signal ports based on one or more indices of the ports of the first set of reference signal ports and the ports of the second set of reference signal ports.

6. The apparatus of claim 3, wherein the at least one processor is further configured to:
receive, from the network device, a third configuration that identifies the relationship between the ports of the first set of reference signal ports and the ports of the second set of reference signal ports, wherein the determination of the adaptation of the at least one layer associated with the at least one reference signal port of the second set of reference signal ports is based on the third configuration.

7. The apparatus of claim 3, wherein the at least one processor is further configured to:
determine a measurement of a channel associated with the downlink transmission based on the at least one reference signal port of the first set of reference signal ports, wherein the determination of the adaptation of the at least one layer associated with the at least one reference signal port of the second set of reference signal ports is based on the measurement of the channel.

8. The apparatus of claim 2, wherein the first set of reference signal ports and the second set of reference signal ports comprise demodulation reference signal ports.

9. The apparatus of claim 8, wherein a configuration associated with the second set of reference signal ports is based on at least one of a precoder granularity, a density of the reference signal ports, a frequency occupancy, a time occupancy, or a code division multiplexing (CDM) type, and wherein the configuration associated with the second set of reference signal ports is different from a configuration associated with the first set of reference signal ports.

10. The apparatus of claim 2, wherein the at least one processor is further configured to:
receive, from the network device, a second configuration to identify the at least one interference layer associated with the at least one layer, wherein the adaptation is based on the at least one interference layer.

11. The apparatus of claim 10, wherein the at least one processor is further configured to:
identify a relationship between the at least one interference layer and ports of the second set of reference signal ports; and
determine the adaptation of the at least one layer is based on the relationship.

12. The apparatus of claim 11, wherein the at least one processor is further configured to:
receive a third configuration to identify the relationship between the at least one interference layer and ports of the second set of reference signal ports.

13. The apparatus of claim 12, wherein, to receive at least one of the configuration, the second configuration, or the third configuration, the at least one processor is configured to:
receive, from the network device, one or more configurations via one or more fields of a downlink control indicator, or receive, from the network device, the configuration in a downlink control indicator format, wherein the configuration is based on capability information.

14. The apparatus of claim 1, wherein the at least one layer is adapted via subtraction of a product of the at least one interference layer and at least one perturbation factor, and wherein determination of an adaptation further comprises determination of the at least one perturbation factor.

15. An apparatus for wireless communication, comprising:
a memory; and
at least one processor coupled to the memory, wherein the at least one processor is configured to:
determine that at least one layer of a set of layers of a downlink transmission is adapted based on at least one interference layer, and that the at least one adapted layer is mapped to a reference signal port;
transmit, to a user equipment (UE), a configuration associated with a layer to reference signal port mapping based on the determination; and
transmit the downlink transmission to the UE based on the configuration.

16. The apparatus of claim 15, wherein the at least one processor is further configured to:
determine a first set of reference signal ports and a second set of reference signal ports, wherein the at least one adapted layer is mapped to at least one reference signal port of the first set of reference signal ports, and that an adaptation is associated with at least one reference signal port of the second set of reference signal ports;
transmit the first set of reference signal ports and the second set of reference signal ports to the UE; and
transmit a second configuration associated with the first set of reference signal ports and the second set of reference signal ports.

17. The apparatus of claim 16, wherein the at least one processor is further configured to:
determine a relationship between ports of the first set of reference signal ports and ports of the second set of reference signal ports;

determine the adaptation of the at least one layer associated with the at least one reference signal port of the second set of reference signal ports based on the relationship; and transmit the first set of reference signal ports and the second set of reference signal ports based on the determination.

18. The apparatus of claim 17, wherein the relationship is based on a fixed rule.

19. The apparatus of claim 18, wherein the relationship is based on one or more indices of the ports of the first set of reference signal ports and the ports of the second set of reference signal ports.

20. The apparatus of claim 18, wherein the at least one processor is further configured to:
determine a configuration of the relationship between the ports of the first set of reference signal ports and the ports of the second set of reference signal ports; and
transmit, to the UE, the configuration of the relationship between the ports of the first set of reference signal ports and the ports of the second set of reference signal ports.

21. The apparatus of claim 17, wherein the at least one processor is further configured to:
determine one or more indices of the ports of the first set of reference signal ports and the ports of the second set of reference signal ports, wherein the relationship between the ports of the first set of reference signal ports and the ports of the second set of reference signal ports is based on one or more indices of the ports of the first set of reference signal ports and the ports of the second set of reference signal ports; and
transmit the first set of reference signal ports and the second set of reference signal ports based on the determination.

22. The apparatus of claim 16, wherein the at least one processor is further configured to:
identify at least one interference layer associated with the at least one adapted layer of the UE; and
identify a relationship between the adaptation and the at least one interference layer, wherein transmission of the configuration comprises transmission of the configuration that indicates the relationship between the adaptation and the at least one interference layer.

23. The apparatus of claim 16, wherein the at least one processor is further configured to:
transmit, to the UE, a third configuration to identify the at least one interference layer associated with the at least one layer, wherein the adaptation is based on the at least one interference layer.

24. The apparatus of claim 23, wherein the at least one processor is further configured to:
receive, from the UE, capability information associated with the at least one layer; and
determine at least one of the configuration, the second configuration or the third configuration based on capability information.

25. The apparatus of claim 23, wherein, to transmit at least one of the configuration, the second configuration, or the third configuration, the at least one processor is configured to:

transmit, to the UE, one or more configurations via one or more fields of a downlink control indicator, or transmit, to the UE, the configuration in a downlink control indicator format, wherein the configuration is based on capability information.

26. A method of wireless communication performed by an apparatus, comprising:
receiving, from a network device, a configuration associated with a layer to reference signal port mapping;
identifying, based on the configuration, that at least one layer of a set of layers used to receive a downlink transmission from the network device is adapted based on at least one interference layer, wherein the at least one adapted layer is mapped to one or more reference signal ports;
receiving the downlink transmission; and
decoding the downlink transmission based on the identification that the at least one layer is adapted and the layer to reference signal port mapping.

27. The method of claim 26, further comprising:
receiving, from the network device, a second configuration associated with a first set of reference signal ports and a second set of reference signal ports;
identifying, based on the second configuration, that the at least one layer is mapped to at least one reference signal port of the first set of reference signal ports, and that an adaptation of the at least one layer is associated with at least one reference signal port of the second set of reference signal ports; and
receiving the first set of reference signal ports and the second set of reference signal ports.

28. The method of claim 27, further comprising:
identifying, a relationship between ports of the first set of reference signal ports and ports of the second set of reference signal ports; and
determining the adaptation of the at least one layer associated with the at least one reference signal port of the second set of reference signal ports based on the relationship.

29. The method of claim 26, further comprising:
receiving, from the network device, a second configuration to identify the at least one interference layer associated with the at least one layer, wherein an adaptation is based on the at least one interference layer.

30. A method of wireless communication performed by an apparatus, comprising:
determining that at least one layer of a set of layers of a downlink transmission is adapted based on at least one interference layer, and that the at least one adapted layer is mapped to a reference signal port;
transmitting, to a user equipment (UE), a configuration associated with a layer to reference signal port mapping based on the determining; and
transmitting the downlink transmission to the UE based on the configuration.

* * * * *